United States Patent
Jones

(10) Patent No.: US 10,958,658 B2
(45) Date of Patent: Mar. 23, 2021

(54) SYSTEMS AND METHODS FOR DIFFERENTIATED IDENTIFICATION FOR CONFIGURATION AND OPERATION

(71) Applicant: Michael T. Jones, Los Altos, CA (US)

(72) Inventor: Michael T. Jones, Los Altos, CA (US)

(*) Notice: Subject to any disclaimer, the term of this patent is extended or adjusted under 35 U.S.C. 154(b) by 135 days.

(21) Appl. No.: 16/000,832

(22) Filed: Jun. 5, 2018

(65) Prior Publication Data

US 2019/0058712 A1 Feb. 21, 2019

Related U.S. Application Data

(60) Provisional application No. 62/520,462, filed on Jun. 15, 2017.

(51) Int. Cl.
*H04L 29/06* (2006.01)

(52) U.S. Cl.
CPC .......... *H04L 63/102* (2013.01); *H04L 63/083* (2013.01); *H04L 63/10* (2013.01); *H04L 63/18* (2013.01); *H04L 63/20* (2013.01)

(58) Field of Classification Search
CPC ..... H04L 63/102; H04L 63/083; H04L 63/18; H04L 63/20
USPC .......................................................... 726/4
See application file for complete search history.

(56) References Cited

U.S. PATENT DOCUMENTS

2009/0259588 A1* 10/2009 Lindsay ............... G06Q 20/102
   705/40
2015/0324577 A1* 11/2015 Singh .................. H04L 63/0807
   726/6

OTHER PUBLICATIONS

USPTO, ISA/US, "Notification of Transmittal of the ISR and the Written Opinion of the International Searching Authority, or the Declaration," in PCT Application No. PCT/US2018/037355, dated Sep. 14, 2018, 6 pages.

\* cited by examiner

*Primary Examiner* — Evans Desrosiers
(74) *Attorney, Agent, or Firm* — Kang S. Lim

(57) ABSTRACT

A differentiated identification system facilitates dynamically differentially morphed access for one or more requesters. The system receives an access request including at least one differentiable voucher from a requester and assesses the type of the received access request by considering the access request, the differentiable voucher and one or more semblances. The system then dynamically differentially morphs an access to one or more service or data based on the assessment of the access request type, enabling the system to provide the requester with dynamically differentially morphed access to the one or more service or data.

8 Claims, 6 Drawing Sheets

SYSTEMS AND METHODS FOR DIFFERENTIATED IDENTIFICATION FOR CONFIGURATION AND OPERATION

CROSS REFERENCE TO RELATED APPLICATIONS

This U.S. Non-Provisional application claims priority to U.S. Provisional Application No. 62/520,462 filed Jun. 15, 2017, of the same title, which application is incorporated herein in its entirety by this reference.

BACKGROUND

The present invention relates to systems and methods for differentiated identification for configuration and operation.

Given the need to enable utilization of electronic computing devices and/or computer facilitated services by authorized individuals and/or entities, and the need to prevent, control and/or alter utilization of such devices and/or services by and/or under the influence of unauthorized individuals and/or entities, a need exists for differentiated identification for configuration and operation of electronic computing devices and services.

The breach of huge databases exposing extremely sensitive consumer data to a world of bad actors has stripped away billions of dollars in corporate market value and made it woefully and painfully obvious to consumers that the security of their personal data cannot be comfortably entrusted solely to third parties who may have conflicting interests. Revelations such as Stuxnet, the Snowden NSA and 2017 CIA cyber-spying leaks, the 2016 Hillary Clinton campaign hacks and the May 2017 hospital ransom-ware attacks have made consumers aware that the threat to their data privacy and security extends to nation state actors, multi-national corporations and global crime syndicates in addition to pranksters, crooks, white-hat hackers and whistleblowers. Further, as 60% of small companies suffering a cyber attack are out of business within six months, this has become an existential threat to investors, employers, and employees worldwide.

Third parties—typically not consumers—control the storage, structure, protection, authentication and authorization of access to and use of computer services and data—on both personal devices and remote servers. Even on nominally consumer-owned personal devices, the software on those devices is owned by third parties and often much of the data as well. Typically, a user must use the security mechanisms and the access policies provided by the device manufacturer and/or a remote service provider. It is nearly impossible for a user to alter, replace, strengthen or alter those security facilities outside of the bounds of often poorly documented menus of settings whose effects are often hidden and which may change without notice. It is largely a poorly understood take-it-or leave it proposition.

Worse, today's secure access control mechanisms have a characteristically binary operation. One either succeeds in being authenticated and gaining access or one fails to be authenticated, thus not gaining access and instead typically notified of one's failure. This regime is extremely helpful for bad actors trying to gain illicit access. There is essentially no ambiguity or deception. Failure is quickly and clearly apparent, thus speeding processes of elimination and/or deduction.

Regardless of how well computer systems are secured, they will continue to be breached. Perhaps the most certain reason for this is that licit users are increasingly being coerced by powerful individuals or entities—for example by armed criminals or bullying bosses—to enter their access credentials so that such individuals or entities can gain access to the user's computerized services and data. The true failing of today's systems is this: even though it is well understood that access control will be breached, the systems thusly exposed are not designed to dynamically configure operation in a fashion that differentiates legitimate access from successful (perhaps coerced) illicit access.

Now picture a contrasting example, a system that supports a plurality of valid (i.e., accepted) passwords for a given username. One valid password when authenticated enables normal dynamically configured operation of the accessed computer system. However, another valid password when authenticated enables an alternative dynamically configured operation of the accessed computer system. So, if that latter valid password is provided to a prying boss, it provides seeming access to the coerced user's computer services and data, but in fact provides access to a perhaps similar, but altered, substitute. The intruder is satisfied, but in fact fooled. Even if they are suspicious, they may be hard pressed to be certain that they have been deceived.

It is therefore apparent that an urgent need exists for differentiated identification for configuration and operation of computing devices and services. This improved system for securing computer services and data enables protection via nuanced identification of illicit access coupled with access to a deceptive substitution rather than utilizing absolute access denial.

SUMMARY

To achieve the foregoing and in accordance with the present invention, systems and methods for facilitating dynamically differentially morphed access to a requester are provided.

The differentiated identification system is configured to receive an access request including at least one differentiable voucher from a requester and to assess the type of the received access request by considering the access request, the differentiable voucher and at least one semblance. The system then dynamically differentially morphs an access to one or more service or data based on the assessment of the access request type, thereby providing the requester at least one dynamically differentially morphed access to the one or more service or data.

In some embodiments, the system derives the least one semblance by confirming verisimilitude of the least one differentiable voucher, and wherein the at least one differentiable voucher is selectable by the requester from a plurality of acceptable differentiable vouchers. The plurality of acceptable differentiable vouchers can include a multi-username differentiable voucher, a multi-password differentiable voucher, a multi-voucher differentiable voucher and/or a combined-voucher differentiable voucher.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
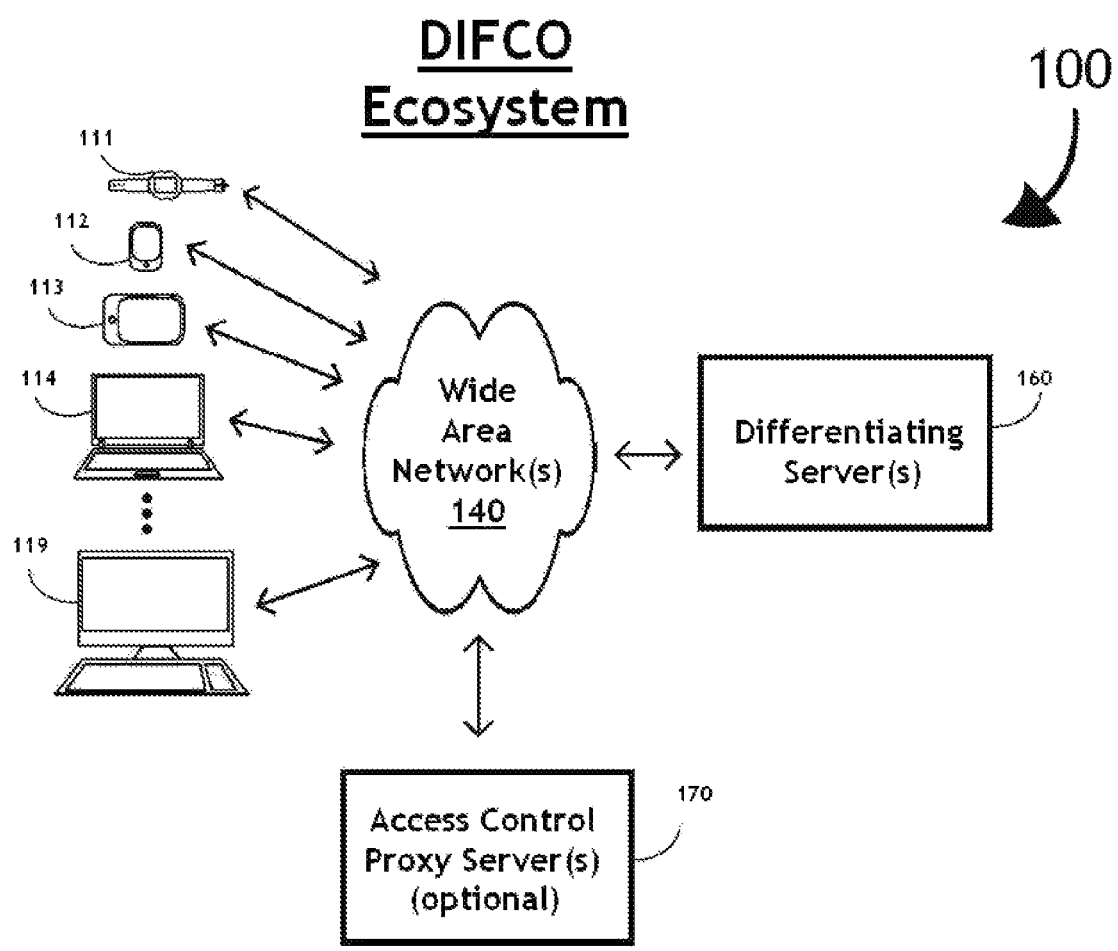
FIG. 1 is an illustrative exemplary Ecosystem for DIFCO systems, in accordance with the present invention.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

In the discussion that follows, particular attention may be placed upon visual displays on a mobile communication device. However, it is important to note that embodiments of the present invention are intended to operate with all manner of consumer electronic network terminal devices including smart phones, computers, tablet computer systems, e-reader devices, and virtually any electronic device which includes WAN access and a user interface. These embodiments are also capable of operating with a wide range of interface types, including any combination of a visual display, tactile and audio output and a visual, tactile or acoustic user interface.

The present invention relates to systems and methods for differentiated identification for configuration and operation (DIFCO). This invention pertains to utilization of at least one mechanism for authenticating user identification and/or user account identification as relates to operation of a computerized system and/or device. Furthermore, this invention concerns dynamic configuring of such a computerized system and/or device based upon and subsequent to a given outcome determination (from a plurality of potential outcomes) of user identification and/or user account identification.

For brevity and consistency, the meanings of several terms used throughout this document are elucidated herein after. Such terms may be additionally described, illustrated by use and/or defined in further detail in other portions of this document.

The terms "computerized system", "computer", "computer system" and/or "computerized device" may refer to a system (e.g., device apparatus, mechanism, contrivance) devised or intended in part for automated operation composed of hardware (e.g., processor, memory, sensors and input/output devices) and programmed instructions for operation (e.g., software, firmware, microcode) as may be well known to someone skilled in the art. A computerized system may, for example, be a 'smart device' such as a digital music player utilized perhaps in a stand-alone mode or connected to a network of other computerized systems. A computerized system may in some instances be a "virtual system"—for example, a virtual system might be an IBM 360 computer simulation hosted on a Linux server and devised to run legacy COBOL programs. A computerized system may be composed of one or more aggregated and/or interoperating computerized systems. Such a composite computerized system may be centralized (e.g., multiple server blades in a single chassis) or distributed (e.g., remote servers and mobile smart devices interconnected and interoperating via computer network(s))—again as may be well known to someone skilled in the art. References to a 'computer' or 'computer system' or 'computerized system' or 'computerized device' may be taken to include components thereof including but not limited to services, programs or data operating or stored therein.

The term "data" may refer to information that is input, stored, retrieved, modified, analyzed, output and otherwise manipulated and/or utilized by a computerized system as may be well understood by one skilled in the art.

The terms "service", as well as variant 'service' terms including "computer service", "computerized service" and/or "system service" may refer to an action or set of actions directed by and/or conducted on behalf of a given user (e.g., modifying data, displaying a screen image, moving a robotic arm, etc.) facilitated by a computer (typically utilizing hard logic and/or programmed logic control) as may be well understood by one skilled in the art. Such computer facilitated action(s) may be largely virtual or may have more apparent real world embodiment such as operation of a physical mechanism.

The term "user" may refer to a human (or to a computerized system) that may utilize (or interoperate with) a computerized system—e.g., a DIFCO system, or a service-providing-system (e.g., an email system) that is integrated with a DIFCO system. Increasingly, a computerized system may utilize or interoperate with another computerized system utilizing a human-intended user interface or utilizing a computer-to-computer interface or utilizing both. In some instances, computerized systems—e.g., 'bots' and 'avatars'—intentionally may simulate humans in such computerized system utilizations as may be well understood by one skilled in the art. Therefore, computerized systems, including such human-simulating computerized systems, may also be users unless stated explicitly otherwise.

The terms "user access request" and "access request" may refer to a computer-apparent signal or encoded message—delivered for instance via a standardized access request protocol—asking for immediate responsive action and/or subsequent permissions relating to reading, modifying or deleting data or selecting, managing, initiating, utilizing, altering or terminating service(s). In some instances, the term 'user access request' or 'access request' may be used descriptively in reference to a corresponding user action resulting in such a computer-apparent signal or encoded message—as may be apparent in context.

The noun 'access' is defined by an on-line dictionary (Merriam-Webster) as: 'permission, liberty, or pass to and from a place or approach or communicate with a person or thing'. The term "access" as well as derivative terms including "accessed", "accessible", "accessing", "accesses" in relation to a computerized system, including the data and service(s) thereof, refer to the permitted action of communicating with and operating such a computerized system—such communicating and operating including, but not limited to: configuring and utilizing service(s) and data as may be well understood by one skilled in the art. Such utilizing of data may include, but not be limited to; defining, reading, modifying, storing, write-protecting, read-protecting, sharing, combining, ordering, sorting, shuffling, randomizing, indexing, aggregating, analyzing, transforming, disaggregating, anonymizing, de-anonymizing, reformatting, compressing, decompressing, importing, relocating, exporting and deleting data—again as may be well understood by one skilled in the art. The degree and nature of permitted communication with and operation of a given DIFCO system and/or a given service-providing-system integrated with a DIFCO system may vary between embodiments of such systems.

The term "licit" utilized as an adjective in relation to aspects of a DIFCO system (or of user identification/authentication systems in general) may refer to a utilization that is authorized or legitimate. So for example, a legitimate/authorized user may be described as a "licit user" The term 'licit' may be used an adjective to describe or qualify terms related to DIFCO system utilization—e.g., "licit access", "licit access request", "licit access voucher", "licit owner", "licit password/username combination", "licit username", "licit password"

The term "illicit" utilized as an adjective in relation to aspects of a DIFCO system (or of user identification/authentication systems in general) may refer to a utilization that is not authorized or illegitimate. So for example, an illegitimate/unauthorized user may be described as an "illicit user" The term 'illicit' may be used an adjective to describe or qualify terms related to DIFCO system utilization—e.g., "illicit access", "illicit access request", "illicit access voucher", "illicit owner", "illicit password/username combination", "illicit username", "illicit password".

The term "normal" utilized as an adjective in relation to aspects of a DIFCO system (or of user identification/authentication systems in general) may refer to that which is the "norm"—i.e., that which is intended and licit for use by a licit user. The term 'normal' may be used an adjective to describe or qualify terms related to DIFCO system utilization—e.g., "normal service", "normal data", "normal use" and "normal operation".

The terms "voucher" and "access voucher" may refer to a digitally (or otherwise) encoded artifact that individually or in combination with additional voucher(s) may be received and utilized by a DIFCO system (or by other user identification/authentication system in general) to uniquely ascertain the validity of such a voucher(s), the account associated with such a voucher(s) and corresponding access permissions of a requester so as to deny or grant that requester access to some portion of services and/or some portion of data that may be available from that computerized system. Examples of such an artifact include username/password combination, account ID/PIN combination, biometric marker (e.g., finger print scan, retinal scan, facial scan, voice scan), encrypted token (e.g., from a credit card chip scan) and trusted third-party provided identity endorsement.

The terms "account" and "user account" may be utilized interchangeably in relation to a given computerized system such as a DIFCO system and may refer to user-related information including permissions utilized to monitor, control and perhaps configure a given requester's access to service(s) and/or data operating or stored therein as may be well understood by one skilled in the art. Additionally, they may relate to a given stand-alone service(s) and data access provided by a computerized device as well as to a given remotely-accessible (e.g., via the Internet) service(s).

The terms "account ID", "user account ID", "account identifier" and "user account identifier" utilized relative to a given access request may refer to an access voucher (or component thereof) associated with such an access request that uniquely corresponds directly to a specific user's account as may be well understood by one skilled in the art. In some embodiments, an 'account ID' may be communicated embedded in the associated access request.

The terms "username", "user name", "user ID" and "user identifier" utilized relative to a given access request may refer to an access voucher (or component thereof) that may be utilized (e.g., in association with such an access request) as an account ID or a partial component thereof, but may additionally be utilized to nominally (but not necessarily reliably) identify a user requesting access as may be well understood by one skilled in the art.

The terms "password", "pass word", "passcode" and "pass code" utilized relative to a given access request may refer to an access voucher (or component thereof) that may be utilized (e.g., in association with such an access request) as a mechanism to confirm that the requestor is a licit user as may be well understood by one skilled in the art. Typically, a 'password' is at least nominally secret and is utilized as a 'shared secret' between a licit user (or set of licit users) and a given user identification/authentication system—again as may be well understood by one skilled in the arts. To the extent that 'alternative identifiers' such as a personal identification number (PIN), biometric marker (e.g., iris image) or other measurement value, code or token may be utilized in a similar fashion to confirm that the requestor is a licit user, such alternative identifier may be utilized in place of or in addition to a 'password' as a component of an access voucher—yet again as may be well understood by one skilled in the art.

The term "valid" as well as derivative terms including "validity", "validate" and "validation" utilized in relation to an access voucher (and/or an associated access request) may refer to an access voucher that may be determined by a DIFCO system to have a match within a set of acceptable access voucher values—e.g., maintained by a DIFCO system as secure reference data. In some embodiments, a DIFCO system may intentionally allow access not only to a licit user, but also to an illicit user, and therefore the illicit user's corresponding illicit access voucher may be determined to be valid so as to allow such intended access. In instances of a given valid access voucher being composed of a plurality of components (e.g., username and password), each such component may be termed 'valid' as part of the whole valid access voucher—e.g., valid username and valid password as parts of a valid username/password combination comprising a valid access voucher. Additionally, if the associated access voucher of a given access request is validated, then that access request may also be said to be 'validated'—i.e., the 'validation' of a given access request results from the validation of its associated access voucher. The term "confirming verisimilitude" is synonymous and interchangeable with the terms 'validating' and 'validation'.

In some embodiments of a DIFCO system, an access voucher may be composed of components that may be received individually utilizing mechanisms intended for the acquisition of access vouchers such that those components seem nominally to be access vouchers themselves. However, for the purposes of validation, a DIFCO system may combine such components so as to derive a single "combined access voucher" which may then be validated.

The term "access-validated" in relation to a DIFCO system (or other user identification/authentication system) may refer to a given user whose access voucher associated with an access request by (or proxied for) that user has been validated. Such an access voucher may be said to be an "access-validating" access voucher.

The term "assess" as well as derivative terms including "assessed", "assessing" and "assessment" may refer to the process of analyzing an access request and associated access voucher and corresponding account information (if any) so as to determine the type of the access request made by that user. In the process of assessment, prior to determining the type of the access request, a DIFCO system may further consider an access request—for example, utilizing one or more semblances to consider the source of the access request and associated access voucher (say based on source IP address and perhaps infer the intent of the corresponding requesting user. Such additional consideration of an access request may affect the outcome of the determination of the type of the access request. By way of analogy, a liquor store clerk may assess a young man's request to buy a six pack of beer—determining by the format, holographic seals and expiration date of the presented driver's license that it is valid; judging by the license's date of birth representation that the licensed driver is of legal drinking age, but judging by looking at the buyer that he is seemingly underage and not the person pictured on the license, therefore, intending to masquerade as the licensed driver so as to falsely appropriate the licensed driver's licit right to buy beer.

The term "deem" utilized in relation to an access request may refer to the result of the assessment of that access request wherein that access request is determined (i.e., "deemed") to be of a specific assessed access request type; and the act of such determining is "deeming".

The term "semblance" utilized in relation to a given user's access request may refer to recorded and/or communicated data conveying an intentional or inadvertent user signal or other information useful in affecting, qualifying, augmenting or modulating the assessment of the user's corresponding access request as well as any inference of the identity and/or intent of the user requesting the access. One or multiple semblances may be utilized in the assessment of an access request.

The term "distinguishingly" when utilized in relation to a plurality of access vouchers may refer to a signal decoded or otherwise inferred individually from each such access voucher and utilized as a semblance that may differ between such access vouchers and therefore may facilitate a DIFCO system to distinguish such access vouchers from each other.

The term "out-of-band" utilized in relation to a given communication may refer to a communication utilizing a separate channel, medium and/or service to communicate than another communication as may be well understood by one skilled in the art. The term "in-band" utilized in relation to a given communication may refer to a communication utilizing the same channel, medium and/or service to communicate as the given communication as also may be well understood by one skilled in the art.

The terms "configuring" and "configuration" utilized in relation to a computerized system integrated with a DIFCO system may refer to arrangement and/or alteration of the physical and/or logical organization and/or operation of that computerized system and components thereof—including but not limited to services, programs or data operating or stored therein as well as access thereto—as may be well understood by one skilled in the art. The term "morph" may be used interchangeably as a synonym for the term 'configure'. The term "morphed" may be used interchangeably as a synonym for the term 'configured'. The term "morphing" may be used interchangeably as a synonym for the terms 'configuring' and 'configuration'.

The terms "differential", "differentially" and "differentiated" utilized in relation to a configuring or a configuration of a computerized system (including but not limited to services and data therein and access to such services and data) may refer to specific configuring of such a computerized system resulting from the assessment of a given user access request by a DIFCO system integrated with that computerized system—that assessment being facilitated by one or more semblances.

The terms "requester" and "requesting user" utilized in relation to a DIFCO system refers to a user (licit or illicit) making an access request to a DIFCO system (or to an illicit user coercing a licit user to make such an access request), and subsequent to that access request being assessed, such a user that may utilize the corresponding differentiated service(s) and/or data.

The term "assessment result type" utilized in relation to a given assessment of an access request may refer to the assessment, to the assessed access request, and/or to the dynamically differentially configured access (if any) pursuant to that assessment. The terms "access request type" and "type of access request" referring to a given access request, subsequent to assessment of that access request, are interchangeable with the term 'assessment result type'.

The terms "dynamic" and "dynamically" utilized in relation to phrases that may include the terms 'differentially' or 'differentiated'—including, but not limited to 'differentially configured', 'differentiated configuration', 'differentiated access', 'differentiated service(s)'—refer to a configuration process that is actively performed subsequent to an assessment that results in both the differentiation and the configuration. Such dynamic configuration may, for example, allow a DIFCO system to be highly adaptable and responsive to security threats based on signals from users, from external sources and/or deduced from observed events.

The user-apparent logical construct termed "role", "user role" and/or "specie" utilized in relation to a user—that user being from a set of two or more users with valid access to a given account (i.e., each with a differing differentiable voucher)—may refer to user-apparent access privileges and/or permissions which in effect result from that user's differentiable voucher, requested access and/or additional assessed semblances. For example, two users may have licit access to a given account's service(s) and/or data, but each user's access to such service(s) and/or data may be dynamically differentially configured separately. So, in effect, each access-validated user's dynamically differentially configured access corresponds individually to that user's 'role'.

To facilitate the discussion of some embodiments of the present invention, exemplary labeling of a given assessment result type may be utilized. Such exemplary labels may include, but not be limited to: "okay" (i.e., assessed to be licit), "risk" (i.e., assessed to be illicit), "error" (i.e., assessed to be defective) and "system menacing" (i.e., assessed to be part of an attack against a DIFCO system). So for example: an 'okay' access request assessment may result from a legitimate access request from a licit user; a 'risk' access request assessment may result from a forced, impersonated, unauthorized, illegitimate or malicious access request from an illicit user (or from a licit user coerced by such an illicit user); an 'error' access request assessment may result from an access voucher that may have been mis-entered or poorly remembered (or some other defect in the access voucher); and a 'system-menacing' access request assessment may result from an access request resembling or duplicating or perhaps just arriving concurrently with other requests utilized in an on-going denial of service (DOS) attack as may be well understood by one skilled in the art.

Furthermore, the above assessment result type labels (i.e., 'okay', 'risk', 'error' and 'system-menacing') are intended to be illustrative only—so as to facilitate easily understood examples of assessment—utilizing commonly occurring instances of security challenges. The types of, as well as the meaning of, significance of, and total number of types of assessment results may be different than the above exemplary four types depending on the embodiment. For example, a requester's 'role' conveyed in a semblance may affect an assessment resulting in a unique assessment result type. So further by example, each of say ten different roles within a given account might have its own corresponding unique assessment result type (and corresponding unique access voucher(s)).

The term "differentiable voucher" utilized in relation to a valid access voucher may refer to the uniqueness of that access voucher for a given account such that that access voucher may correspond uniquely to a specific assessed type of access or 'role' for that account and furthermore assessment of that type of access or 'role' may result in granting dynamically differentially configured access for the corresponding access request associated with the 'differentiable voucher'.

The verb 'accept' is defined by an on-line dictionary (the Free Dictionary by Farlex) as: 'admit as sufficient, accede to, admit as satisfactory, agree to allow, comply, confirm'. The terms "accept" as well as derivative terms including "accepted" and "acceptable" utilized in relation to an access voucher or a component thereof (e.g., password, PIN, biometric ID, etc.) and a corresponding access request may refer to a DIFCO system confirming such an access voucher as 'valid' and admitting the corresponding access request for assessment and subsequent dynamic differentiated configured access.

The noun terms "means" and "mechanism" utilized in relation to the present invention may as synonyms interchangeably refer to an enabling or facilitating technique as may be well understood by one skilled in the art.

This invention discloses systems and methods for dynamically differentially configuring computerized systems facilitated by enhancements and/or extensions to the structure of and/or the meaning associated with access vouchers so as to better protect such computerized systems (including services, programs and data therein). Such enhancements/extensions to a given access voucher mechanism may for example be utilized as means of facilitating enhanced user identification, user account selection, user rights management (e.g., privileges and permissions), enhanced security, and/or operational convenience. Furthermore, where possible such enhancements/extensions may be embodied so as to avoid or minimize altering the format of access vouchers and corresponding input mechanisms utilized by DIFCO-upgraded legacy systems.

To facilitate discussion, FIG. 1 shows one embodiment of a DIFCO Ecosystem 100, in accordance with the present invention. FIG. 1 may be useful in illustrating systems and methods for dynamically differentially configuring and operating computerized systems—local and/or remote—for one or more computerized systems users (not shown) over wide area network(s) 140 (WANs) via any of a wide assortment of electronic network terminal devices, e.g., Accessing Communicators 111, 112, 113, 114, . . . 119. Such Accessing Communicators may be utilized to request and potentially receive access to services and/or data from Differentiating Server(s) 160. Additionally, in some embodiments, optional Access Control Proxy Server(s) 170 may supply semblance(s) and/or proxied access request(s) to Differentiating Server(s) 160 so as to potentially facilitate the assessment of a given user's access request.

Accessing Communicators 111-119 represent the multiplicity of devices that may potentially support access to remote services and/or data on other system components of DIFCO ecosystem 100. Additionally, Accessing Communicators 111-119 may potentially directly provide services (e.g., via embedded application programs). Often these communicating computing devices may be mobile devices—i.e., devices that can be carried easily from place to place by an accessing user or a peer user—typically with Wi-Fi or cellular data or other wireless connectivity and in numerous instances with built-in mobile telephone capability. However, portable or fixed installation terminals may also support utilization of DIFCO system services within a DIFCO ecosystem 100. Standalone devices or systems that may operate with zero, limited or intermittent network connectivity—for example, a medical X-ray machine (not shown)—may also embody and/or support utilization of DIFCO system services within a DIFCO ecosystem 100.

In the process of describing various exemplary embodiments, particular attention may be placed upon visual displays on mobile communication devices such as smart phone 112 or laptop computer 114. However, embodiment of the present invention may be accomplished with many alternate embodiments of Accessing Communicators including, but not limited to: smart watches 111, tablet computer systems 113, desktop computers 119, e-reader devices (not shown), automatic teller machines (not shown), point of sale terminals (not shown), sensor devices (not shown), body-implanted personal electronics (not shown), and virtually any other electronic devices (not shown) that include or support networking capability and/or a user interface.

A DIFCO system may be implemented with a wide range of user interface (UI) types, including any combination of a visual display, tactile and audio output and a visual, tactile or acoustic and/or neural connected user interface. In some embodiments, an Accessing Communicator 111-119 may have a user interface as simple as an on/off switch or perhaps a power plug that when plugged into a power source causes such an Accessing Communicator to operate. So, for example, an Accessing Communicator 111-119 may be a home security component such as a network connected video surveillance camera or other sensor.

Although the Internet is a well-known convenient example of a WAN 140 for communication between accessing users and remote servers (and/or peer users), a DIFCO system may also utilize equivalent communication over other WAN(s) 140 using services such as, but not limited to: Virtual Private Network (VPN), leased line network, Public Switched Telephone Network (PSTN), cable network, Voice over Internet Protocol (VoIP), Skype, WhatsApp, Facebook, SnapChat, Twitter and other services that provide or facilitate computer services between remote computing systems.

In some embodiments, a DIFCO system may have numerous potential instantiations and/or implementations corresponding to, and consistent with, typical computer interoperation architectures such as standalone, client-server and peer-to-peer architectures as may be well understood by one skilled in the art. Therefore, a DIFCO system may utilize a unitary-system architecture, or perhaps a distributed systems architecture that may have DIFCO system facilities and capabilities located in and operating with two or more computerized systems—again as may be well understood by one skilled in the art. Many embodiments of a DIFCO system may be suited to operate and/or interoperate successfully within a given computer interoperation architecture or combinations or hybrids or agglomerations of such architectures. Furthermore, a DIFCO system may facilitate peer-to-peer communication between computerized systems, between humans and computerized systems and between humans. As an example of the latter, a DIFCO system may provide an automated user authentication at the front end of a call to a stock brokerage as a security preface to connecting the human caller (i.e., user) with a human customer service representative (i.e., peer).

In many embodiments, a DIFCO system may be integrated or otherwise interworked with a service-providing-system—for example, with a web-based email system such as Gmail (not shown) or a standalone system such as a Gameboy (not shown). Such a DIFCO system may be so integrated so as to facilitate and enhance controlling access to and/or utilization of that service-providing-system. For example, a DIFCO system may be integrated as a security upgrade to a previously non-DIFCO-service-providing-system, so as to dynamically differentially configure and operate that service-providing-system in one of a plurality of dynamic configurations differentiated by the assessment of the type of a given access request to that system. The physical embodiment of such an integration may for example reside in a Differentiating Server(s) 160.

Additionally, a DIFCO system may integrate with a given service-providing-system using dynamic linking/execution mechanisms and/or virtual machine/interpreter facilities such that a DIFCO system may be dynamically integrated utilizing mechanisms such as DLLs, web browser plug-ins, Java, JavaScript as may be well understood by one skilled in the art.

Optionally, in some embodiments, facilities of a DIFCO system may be distributed between two or more devices and/or systems—for example between an access control proxy server 170 and one or more differentiating server(s) 160. Further by example, such an access control proxy server 170 may provide centralized security control and management to consumers. Given that such an access control proxy server 170 may interoperate with multiple differentiating server(s) 160 operated by different service providers—e.g., Facebook and Google—in some embodiments such an access control proxy server 170 may be operated by a third party independent of such interoperating service providers.

Such distributed facilities of a DIFCO system instantiated in part in an access control proxy server 170, may for example facilitate access control for a given consumer to a multiplicity of services wherein the consumer rather than an individual service provider would have control of management, operation and reporting of such a critical security facility—thusly enabling the consumer to obtain more consistent, thorough and accountable security across multiple accessed services. Within such a distributed security architecture, the access control proxy server 170 may need to interoperate with the various individual services on differentiating server(s) 160 and ideally such services may forward user/account-specific access requests to such an access control proxy server 170 for consistent effective access control. Additionally, secure trusted signaling between the access control proxy server 170 and a given differentiating server 160 may for example be utilized to communicate to that differentiating server 160 the access control determination made by the access control proxy server 170. And furthermore, the differentiating server 160 may facilitate dynamic differentiated configuring and operation based on that communicated assessment of the access request type.

In some embodiments, a DIFCO system may exchange information with a communication intermediary—perhaps a device, a system or a service provider—so as to obtain information relating to a given access request that may be utilized as a semblance in assessing that access request. So for example, a DIFCO system may obtain information from the service provider (not shown) of WAN 140 regarding the source of the access request. Such information may for example alert the DIFCO system that the access request may have been 'anonymized' by a TOR relay or Onion server/router as may be well understood by one skilled in the art.

To better understand the scope and breadth of utilization of a multiplicity of DIFCO systems, imagine the myriad diverse and ubiquitous daily uses of password access control regimes and other access authentication mechanisms between users and computerized systems as well as between computerized systems. Now envision each (or perhaps all) of such mechanisms replaced or otherwise augmented by DIFCO systems.

Figure 2:
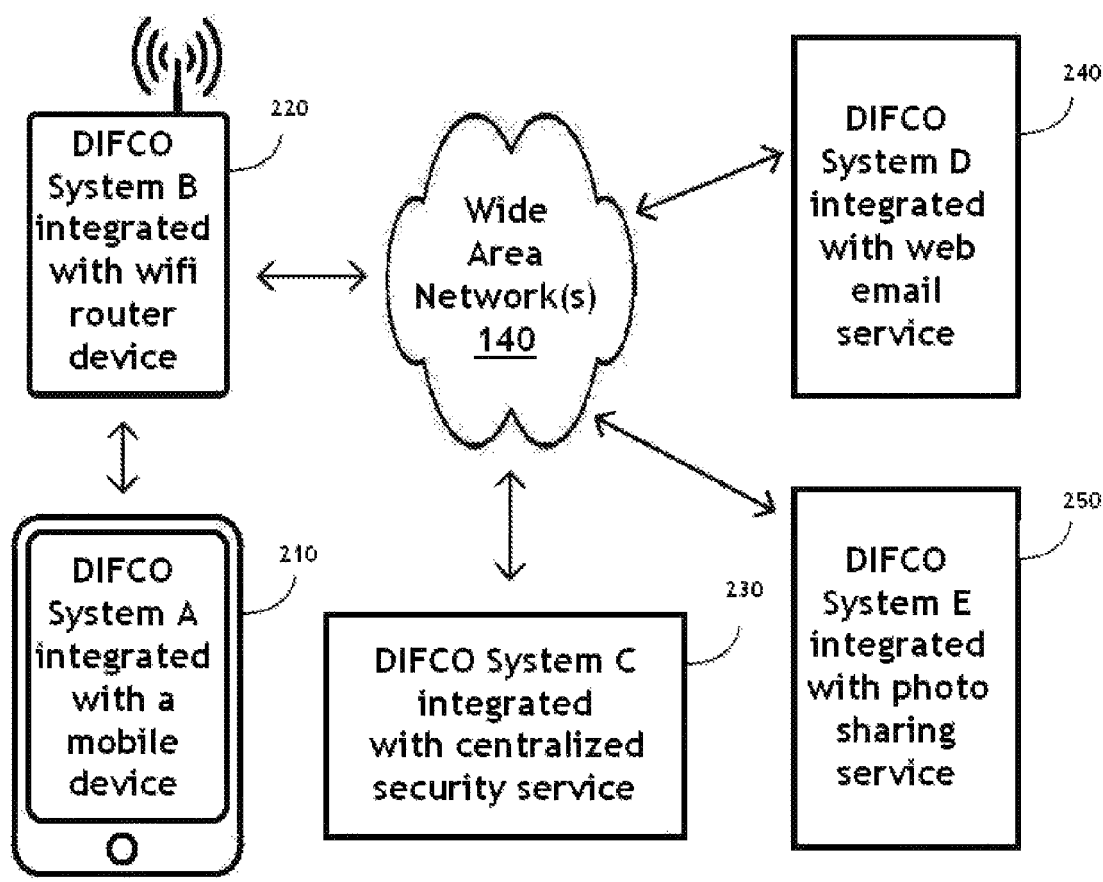
FIG. 2 is a system diagram illustrating exemplary utilizations of DIFCO systems in accordance with embodiment(s) of the DIFCO Ecosystem of FIG. 1.

Referring to FIG. 2, exemplary instances of utilizations of DIFCO systems are illustrated. Let's suppose exemplary user Alice Johnson (not shown) may operate a mobile device system 210 (say of the smart phone 112 type) to access a centralized security service system 230 (hosted on a server of the Access Control Proxy Server 170 type) as well as to access several web-based service systems 240 and 250 (hosted on servers of the Differentiating Servers 160 type). In doing so, Alice may utilize multiple instances and embodiments of DIFCO systems—as may be illustrated by the exemplary instances depicted in FIG. 2 and described below.

Instance 1: Alice may utilize DIFCO System A integrated with mobile device 210 to gain password controlled dynamically differentially configured access to the operating features of that device including web browsing and embedded application programs as well as dynamically differentially configured access to data such as photographs stored in the mobile device.

Instance 2: Alice may utilize DIFCO System B integrated with Wi-Fi router device 220 to gain password controlled dynamically differentially configured access to internet communication services and via the internet (i.e., WAN(s) 140) potential access to several remote systems—230, 240 and 250.

Instance 3: Alice may utilize DIFCO System C integrated with centralized security service 230. For example, she may utilize such a DIFCO integrated security service 230 as a centralized secure repository for numerous passwords and perhaps other secret or sensitive information. Additionally, Alice may utilize DIFCO System C to log-in to other services on her behalf (at her direction) and to correspondingly re-direct or forward communication between her browser and any system thusly logged into. In this way, for example, Alice may utilize a plethora of passwords so as to avoid predictability and yet not be burdened to memorize them. Alternatively, or in addition, DIFCO System C may serve as a proxy for other remote systems—e.g., 240 and 250—by handling log-in authentication for them (perhaps facilitated by tokens such that those remote systems avoid storing sensitive security information such as passwords as may be well understood by one skilled in the art). DIFCO System C may additionally provide varied services for a remote system (in addition to those services provided to users such as Alice). System C may, for example, provide semblance(s) that may support the log-in process for dynamically differentially configured access to a service on a remote system. Additionally, communication between Alice and DIFCO System C as well as relayed communication between DIFCO System C and DIFCO System D (or DIFCO System C and DIFCO System E) may be further secured by use of virtual private networks to tunnel the internet as may be well understood by one skilled in the art.

Instance 4: Alice may utilize DIFCO System D—facilitated by proxy log-in and relay from DIFCO System C as discussed above—to gain dynamically differentially configured access to the service-providing-system for web email integrated with DIFCO System D 240. In this instance, DIFCO System C may provide an encrypted token (serving as an access voucher) to DIFCO System D causing DIFCO System D to grant Alice licit dynamically differentially configured access without System D directly conducting a log-in dialog with her. In other words, DIFCO System C may conduct that log-in dialog and relay the result as a proxy for DIFCO System D as may be well understood by one skilled in the art.

Instance 5: Alice may utilize DIFCO System E—augmented by signaling from DIFCO System C—to gain dynamically differentially configured access to DIFCO System E and its integrated service-providing-system for photo sharing 250. In this instance, DIFCO System C may relay an encrypted endorsement to DIFCO System E as a semblance strengthening the legitimacy of Alice's access request to DIFCO System E. DIFCO System E may conduct a log-in dialog with Alice, but additionally use the externally-sourced encrypted endorsement as a semblance that Alice's access request is a licit one. In some embodiments of a DIFCO system, such an additional semblance originated from an external source may be required to assess an access request.

These are just some exemplary instances of varying utilizations of multiple co-existing and/or interoperating DIFCO Systems within a DIFCO Ecosystem 100. Many other embodiments are possible. Furthermore, DIFCO systems may be embodied, arranged and organized in a myriad of ways including stand-alone and/or a collection, combination, aggregation, hierarchy or network of DIFCO systems.

A typical voucher system commonly may utilize username and password components, joining a public username component with a private password component (or equivalent personal identification number (PIN)), the combined pair comprising a voucher associated with a single user, account, or user role. In use, presentation of the unique voucher—comprised of username and its paired password—identifies a user (and typically a corresponding account).

The present invention removes the uniqueness constraint from the above and other access voucher systems by associating, individually or in any combination, multiple differing access vouchers with a single user, account, or user role to enable a given user to select from a multiplicity of access vouchers as a mechanism for differentially and dynamically configuring accessed computerized systems (including services and/or data therein). Such multiple differing access vouchers may utilize multiple differing usernames, multiple differing passwords (or cryptographic key sequence alternatives, biometric fingerprint choices, etc.) per username, or multiple differing access voucher systems (e.g., username and password, key card, biometrics, etc.).

In some embodiments, a primary utilization of a DIFCO system is to differentiate between licit access requests and illicit access requests for a given account, and furthermore, to satisfy both types of access requests, but in a differentiated fashion, so as to prevent illicit access requests from gaining access to some portion of licitly-accessed services and/or data and to potentially enable illicit access requests to have access to services and/or data other than that accessed by a licit user. However, in more general utilizations, a DIFCO system may additionally facilitate access requests for a larger set of differentiated types of dynamically differentially configured access—i.e., 'roles'—greater than just the two mentioned above (i.e., licit and illicit) for a given account. Such facilitation of from two up to N differentiated roles (where N is a whole number equal to or greater than two), may provide a highly flexible means to provide secure dynamically differentially configured access to a plurality of users (perhaps a very large plurality of users). A set of roles for a given account facilitated by a DIFCO system may include licit uses, illicit uses or a mixture of both licit and illicit uses. In some embodiments, the user-apparent characteristics of a given role may be arbitrary as long as the DIFCO system can differentiate that role from other roles based on the differentiable voucher (or vouchers) uniquely associated with that role. Furthermore, roles may be account specific, such that the user-apparent characteristics of roles for one account may be different than those utilized for another account. For example, one account may have two roles—one for a licit user ('okay' role) and one for an illicit user ('risk' role). Whereas, in contrast, another account may have roles corresponding to licit users with varying access requirements—say for example, users Alice Johnson and her family members using social networking. The roles in such an exemplary Johnson family account include: 'Mom', 'Dad', 'Granny', 'Gramps', 'Little Brother' and 'Auntie Mary'. Furthermore, such an exemplary account might include roles for illicit users as well—say: 'snoopy boss Ned', 'ex-boyfriend Billy', 'BFF—not Judy', and 'guy peeping over my shoulder at Starbucks'.

Furthermore, in some embodiments of the present invention, the presence or absence of one or more semblances—individually or in combinations—may be utilized to certify, supplement, weight, tune, temporize, modify or otherwise affect the assessment of an access request. The lack of an observed semblance, i.e. a non-present semblance or no semblances at all, may in some embodiments be recognized, captured and conveyed by a DIFCO system creating a semblance signifying the observed lack of semblance(s), wherein that thusly signifying semblance may then affect the assessment of a given access request. This is an important semblance capability in that, for example, the lack of a prior known behavior of a user may be indicative of or signify a potential security threat. In some embodiments, a DIFCO system may create such semblance(s) just prior to or as part of the assessment of an access request.

Although artificial intelligence has made great progress, human intelligence may still in many ways be superior. Consequently, in some embodiments, a DIFCO system may share semblance(s) with a given human user. So, for example, upon log-in a DIFCO system might display to a user the following message: 'Suspected log-in hacking attempt on May 20, 2017 at 7:30 PM—did you attempt to log-in then?'. Additionally, a given user may provide semblance(s) to a DIFCO system—for example by replying to a DIFCO system query such as in the preceding sentence or providing an unsolicited report. In some embodiments, a DIFCO system may provide semblance(s) to a human user out-of-band—e.g., sending a security alert via text message.

Additionally, in some embodiments, DIFCO systems (as well as other computerized systems) may share semblances. Such sharing may, for example, facilitate a larger scoped awareness of the quantity, quality, source and timing of potential hacking attempts against a plurality of such semblance sharing systems such that pattern(s) may be deduced. Additionally, a DIFCO system may report semblances to authoritative individuals such as IT professionals to facilitate analysis by human intelligence of potential security threats. Additionally, DIFCO systems may acquire semblances from such authoritative individuals.

In some embodiments, sharing of semblances between DIFCO system(s) and human user(s) (or between DIFCO systems) may be facilitated by an Access Control Proxy Server 170—perhaps a centralized security service system 230. Additionally, such sharing may be facilitated between human users—perhaps via on-line user forums—such that human intelligence of security threats may be shared and corresponding semblances created and shared with DIFCO system(s).

A different sort of sharing—i.e., via social networking—has hugely complicated securing computerized systems, services and data. Social networking enables humans to carelessly and inadvertently share large amounts of personal and/or sensitive information with persons and computer systems world-wide—some that may be bad actors. Ownership and securing of such shared information may largely be under the control of social network corporations such as Google, Facebook, Weibo, Snapchat and Twitter. Often such sharing is proscribed in limited ways by complex and shifting policies again controlled largely by social network corporations. Additionally, a huge market exists for reselling aggregated and cross-correlated personal and sensitive information—not just from social networks, but also from other organizations with access to such information—e.g., Target, Amazon, Visa, Experian, as well as numerous government agencies.

Unfortunately, social networks share—sometimes intentionally—the sensitive information of third parties exposed by social network users—sometimes euphemistically referred to as friends or friends of friends. So for example, an employee may share derogatory information about their employer. Or perhaps, a malicious individual exposes explicit pictures or writings of a former lover—a practice known as 'revenge porn'. Such behavior has opened the door for persons in positions of power such as law enforcement and employers to compel or coerce users to divulge their social network account login access vouchers so that such powerful persons may rummage around in those thusly compromised accounts. This is a growing and insidious problem in that such compromises bypass the current generation of computer security mechanisms.

In some embodiments, a DIFCO system may acquire semblances from social networking systems so as to convey information regarding the sharing of a given user's personal/sensitive information. Such acquisition may be from a social networking system with which the DIFCO system is integrated or from an external social networking system.

Figure 3:
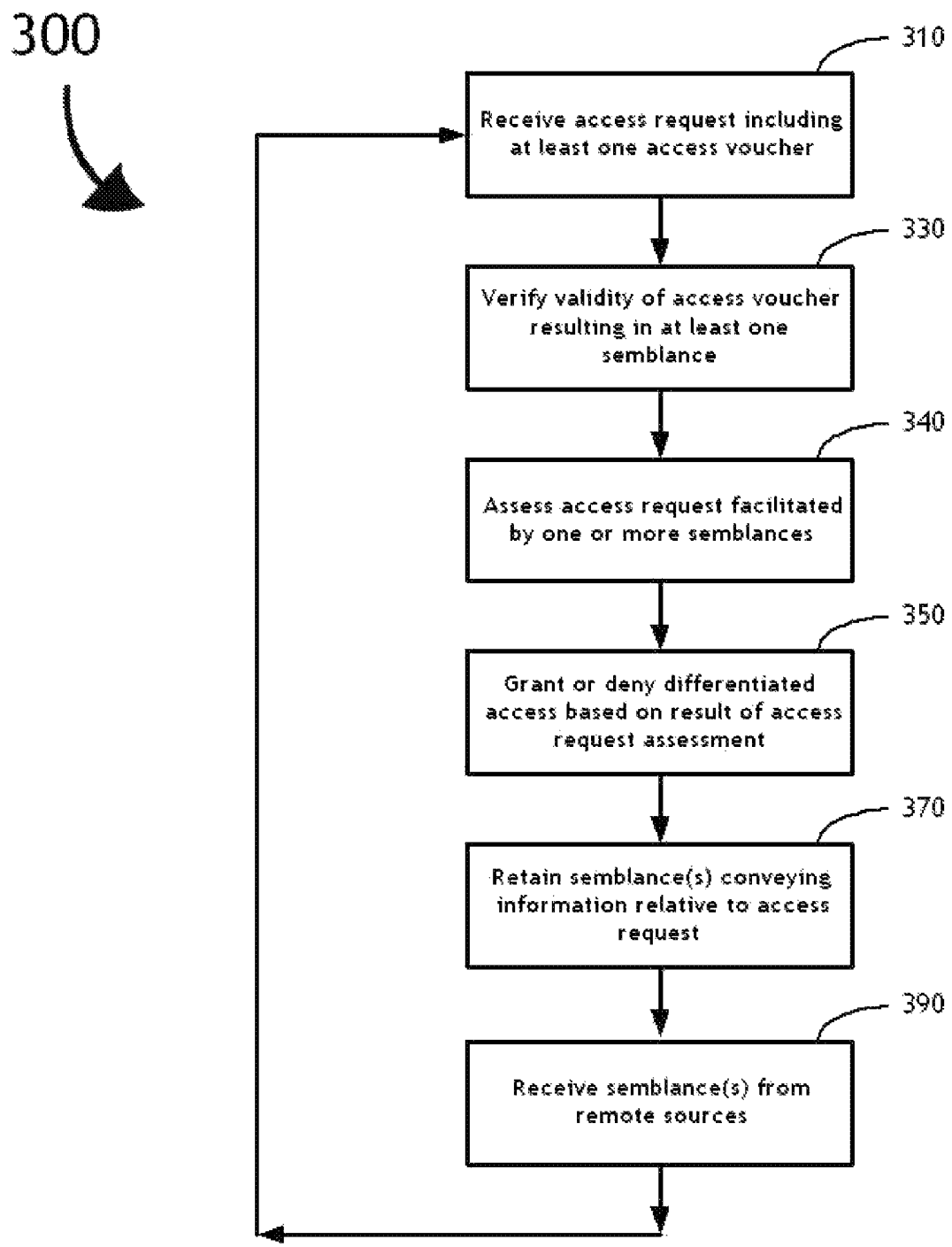
FIG. 3 is a flow diagram illustrating the functionality of an exemplary embodiment of a DIFCO system within the DIFCO Ecosystem of FIG. 1.

FIG. 3 is a flow diagram illustrating the functionality of some embodiments of a DIFCO system within the DIFCO Ecosystem 100 of FIG. 1.

Referring to step 310 in some embodiments, an exemplary DIFCO system may receive an access request. An at least one access voucher may be associated with the access request.

Referring to step 330, in some embodiments, the DIFCO system may validate the access voucher (or access voucher(s)) associated with the access request. In this example, one may assume that one access voucher is utilized. In some embodiments of a DIFCO system a plurality of access vouchers may be associated with a given access request as may be discussed subsequently in this specification.

In some embodiments, a DIFCO system may exchange information with a separate access voucher authority in order to validate a given access voucher associated with an access request. For example, an access request may utilize credit card chip information as an access voucher which may include a token that is intentionally unintelligible to a DIFCO system. Therefore, the DIFCO system may relay such a token to a third-party credit card processing system (perhaps along with DIFCO system provided user information) and receive back information (perhaps user identifying information and/or a signal of successful or unsuccessful validation of the access voucher) from that credit card processing system to be utilized by the DIFCO system to complete validation of the access voucher—as may be well understood by one skilled in the art.

In some embodiments, a DIFCO system may validate the access voucher by comparing it against a set of unique access voucher values—utilizing one or more of many techniques—where each such access voucher value may correspond to a given account as may be well understood by one skilled in the art. In some embodiments, such a comparison process may utilize a component of the access voucher such as a username or account ID again as may be well understood by one skilled in the art. The result of such a comparison, if a match is not found, is that the access voucher is thusly verified to be 'invalid'. Conversely, the result of such a comparison, if a match is found, is that the access voucher is thusly verified to be 'valid' and an account uniquely corresponding to the access voucher is determined. Such a validation process and validation result is common in many user identification/authentication systems, However, the validation process of a DIFCO system differs in that an additional result may be derived from the validation process—i.e., the determination of the type of access requested. For example, such a requested type of access may be a 'role' specific to the determined account associated with the access voucher value. Such an additional result may be produced in that the set of voucher values utilized for such a comparison above may contain at least two unique voucher values corresponding to a given account, whereby each of those voucher values may correspond to a different type of access request (e.g., 'role') within that given account. In some embodiments of a DIFCO system, the thusly derived validation result(s) may be conveyed in semblance(s) so as to be utilized in the assessment of the corresponding access request.

Additionally, as the result of such a DIFCO system validation process, either the access voucher is matched and thereby verified to be 'valid' and a corresponding account and role within that account may be determined—or, the access voucher is not matched and is thereby verified to be 'invalid'. The validation results—i.e., 'valid' or 'invalid' as well as the corresponding account and role information may be conveyed in one or more semblances associated with the access request.

Furthermore, in some embodiments, additional semblance(s) may be associated with the account corresponding to a verified valid access voucher and its associated access request. Such semblance(s) might convey information such as a 'date/time stamp' for the access request, a source IP address, and other related details. Such semblance(s) may be subsequently utilized to assess the just validated access request and/or subsequent access requests verified by the validation process for the same account.

Referring to step 340, in some embodiments, the DIFCO system may assess the access request so as to determine the type of the access. Such an assessment may be facilitated by one or more semblances (such as the semblance(s) resulting from the account voucher validation process at step 330 above as well as perhaps other semblance(s) conveying previously observed user and account history and/or remotely sourced semblance(s)). The result of such assessment may be the deeming of the type of the access request—e.g., corresponding to the associated role, the nature of the access (e.g., licit or illicit), or perhaps another type of access request such as 'error' or 'system-menacing'.

It should be noted that in some embodiments of a DIFCO system, assessment may be viewed as a sort of 'double checking' or refinement of the validation process (of step 330) result wherein one or more semblances may be utilized to perhaps amend the result of the validation process for a given access request. So for example, such a semblance may indicate that the source of the access request was a TOR server frequently utilized for 'anonymization' by hackers. Therefore, the DIFCO system may assign a different account-specific role (or other type of access request) to the assessed access request.

Referring to step 350, in some embodiments, the DIFCO system may grant or deny the access request based on the assessed type of that access request. If granted, such access may be dynamically differentially configured such that access may be provided to an at least one differentiated service and/or differentiated data as is further illustrated in FIG. 4.

It should be noted that such differential configuration is performed dynamically, subsequent to and as the result of the assessment of the access request. Given the ever-changing and expanding nature of modern computerized services and data—e.g., Facebook, SnapChat, etc.—the alternative, an old-fashioned selection of static pre-configured access, is inadequate to keep up with constantly evolving security needs.

In some embodiments, dynamic differential configuration providing differentiated access to service(s) and/or data may be temporary and specific to a given validated access request—e.g., lasting until the requested access is completed or otherwise terminated, but lasting no further. In other embodiments, such dynamic differential configuration may persist for multiple access requests (corresponding to one given account). Such a "persistent dynamic differential configuration", may for example persist until some concluding semblance or other occurrence is detected by the DIFCO system. Similarly, a given semblance may be temporary or persist for multiple access requests—i.e., a "persistent semblance". Furthermore, a persistent dynamic differential configuration may be facilitated in persisting by one or more persistent semblance(s).

Figure 4:
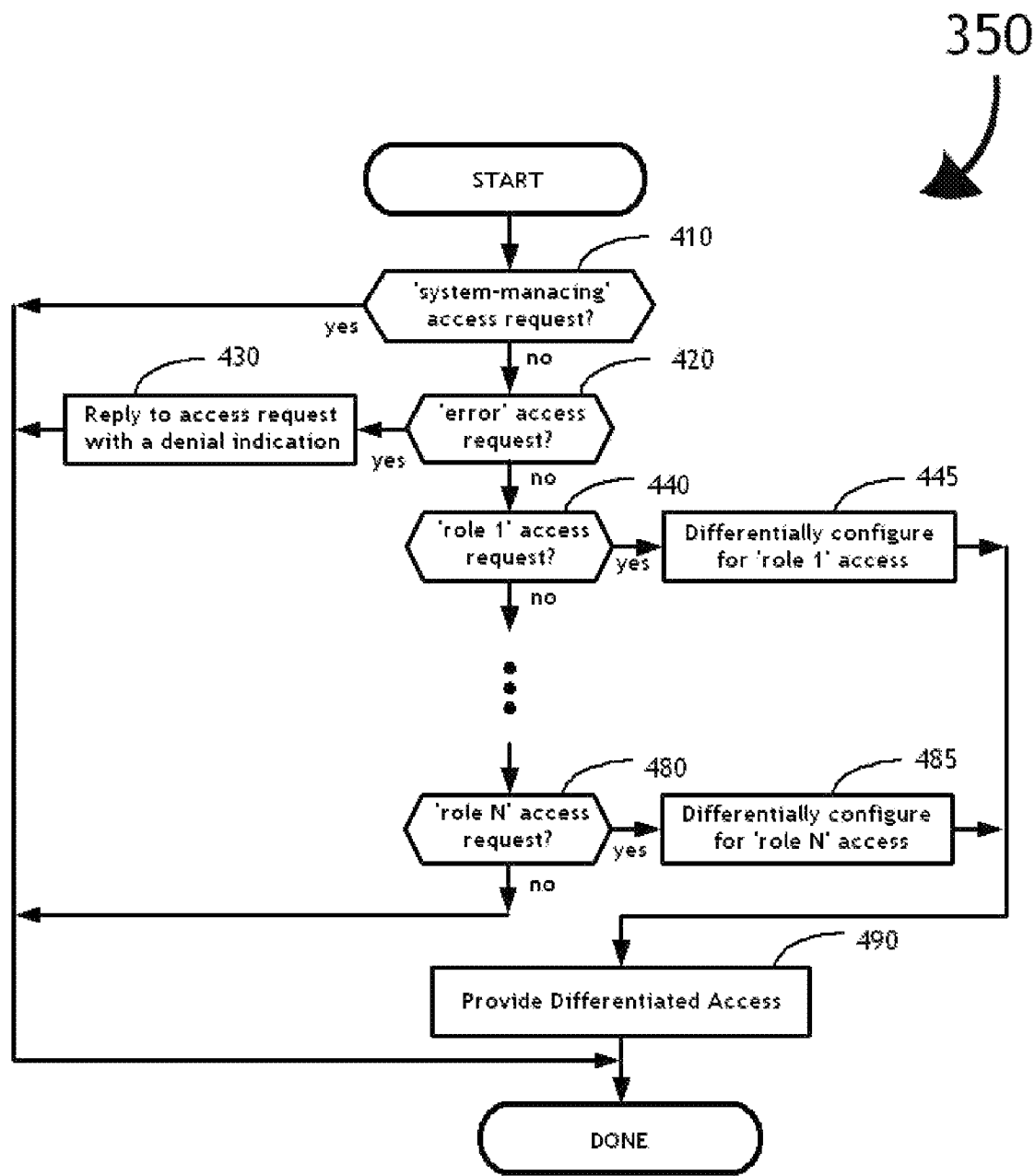
FIG. 4 is a flow diagram further detailing the functionality of step 350 of FIG. 3.

Referring to FIG. 4 at step 410, in some embodiments, the DIFCO system may determine if the type of access request assessed may be 'system-menacing'. If so the DIFCO system may deny access—skipping all additional steps of FIG. 4—and proceed to DONE.

It should be noted that a 'system-menacing' access request may arrive within a highly concentrated sequence of access requests that may constitute a DOS attack (or perhaps just a worst-burst traffic load). Such a DOS attack may in some instances be best defended against by dropping some or all access requests that seem to be intended to overwhelm the processing capability of a DIFCO system. In order to avoid being thusly overwhelmed, a DIFCO system that is seemingly under attack may shed some or perhaps all access requests with little or no validation or assessment of such access requests until such time that the volume of access requests (and other concurrent packet traffic) declines to a manageable point. In many embodiments, an access request assessed to be a 'system-menacing' access request may be discarded without any provided service. In some embodiments, an active defense may be attempted wherein an upstream router or switch may be signaled so as to attempt to staunch the stream of access requests resulting from such a DOS attack.

In some embodiments, a DIFCO system may discard access requests with little or no validation or assessment—for example because a DOS attack (or worst-burst traffic load) may be underway (as described previously above). For example, in some embodiments of a DIFCO system, some access requests such as 'error' and potential 'system-menacing' access requests may be discarded, blocked, denied or otherwise prevented from gaining any dynamic differentiated access to the requested service and/or data as a direct or indirect consequence of a concurrent DOS attack.

Referring to step 420, in some embodiments, the DIFCO system may determine if the type of access request assessed may be 'error'. If the access request is assessed to be an 'error' access request, proceed to step 440, otherwise proceed to step 430.

Referring to step 430, in some embodiments, the DIFCO system may reply to an 'error' access request with a denial indication. Proceed to DONE.

It may be noted that a DIFCO system, in some embodiments, may grant limited differentiated access to a user's 'error' access request. Such differentiated access may for example dynamically differentially configure access that presents the user with a choice to create a new account or to obtain assistance in remembering the user's access voucher.

Referring to step 440, in some embodiments, the DIFCO system may determine if the type of access request assessed may be 'role 1'. If the access request was assessed to be a 'role 1' access request, proceed to step 445.

Referring to step 445 in some embodiments, the DIFCO system may dynamically differentially configure for 'role 1' access, proceed to step 490.

Referring again to step 440, in some embodiments, the DIFCO system may determine that the type of access request assessed may not be 'role 1'. If the access request was not assessed to be a 'role 1' access request, proceed to next step querying the assessed type of the access as indicated by the ellipses. Note the number of roles facilitated by a DIFCO system may vary from 2 to N, where N is a whole number greater than or equal to 2.

Referring to step 480, in some embodiments, the DIFCO system may determine if the type of access request assessed may be 'role N'. If the access request was assessed to be a 'role N' access request, proceed to step 485.

Referring to step 485 in some embodiments, the DIFCO system may dynamically differentially configure for 'role N' access, proceed to step 490.

Referring again to step 480, in some embodiments, the DIFCO system may determine if the type of access request assessed may not be 'role N'. If the access request was not assessed to be a 'role N' access request, proceed to DONE.

Referring to step 490, in some embodiments, the DIFCO system may provide the differentiated access resulting from dynamic configuration.

Referring again to FIG. 3 at step 370, in some embodiments, the DIFCO system may retain semblance(s) conveying information relative to the access request.

The DIFCO system may retain one or more such "residual semblance" continuously for a duration of two or more assessments such that information available at a given assessment may be conveyed via semblance(s) such that it may be available as well at a subsequent assessment. Additionally, such a residual semblance may be transformed by successive assessments. For example, such a persistent residual semblance might convey the source IP address corresponding to the most recently assessed access request. Continuing with this example, a set of such residual semblances might provide a history of source IP addresses corresponding to access requests for a given account. Alternatively, such historical information might be conveyed as a list in a single residual semblance that is updated for each new access request for the given exemplary account.

Referring to step 390, in some embodiments, the DIFCO system may receive zero or more semblance(s) from remote sources. Such a remotely sourced semblance(s) may for example convey the source IP address(es) for an ongoing DOS attack against another DIFCO system.

In some embodiments, a primary utilization of a DIFCO system may be to assess the relative security threat posed by a given access request. In some embodiments, during the assessment process, a DIFCO system may utilize gradation along a scale between illicit and licit so as to correspond to some amount of uncertainty prior to completion of the assessment. Individual semblances utilized in such assessments, may be weighted such that some semblance may have a greater influence on a given assessment than some other semblance(s).

In some embodiments, the assessment of the role of a given valid access request may have differing outcomes (e.g., —one of multiple possible assessed roles) based on the semblance(s) influencing the assessment process. In some embodiments, a measure of relative certainty in a given assessment may be retained—individually or perhaps in aggregate with other such relative certainty measurements—to provide a semblance for a future access request assessment. Additionally, such a "retained assessment" may be refined or transformed in the process of an assessment.

In some embodiments of a DIFCO system, the assessment of the account-specific role corresponding to a given access request may be binary: either 'risk' (i.e., illicit) or 'okay' (i.e., licit). A given DIFCO system, in some embodiments, may utilize semblances to help distinguish a potential 'risk' access request from a potential 'okay' access request. A DIFCO system may over time accumulate multiple semblances specific to given user or user account. Semblances may vary in nature, may have one or multiple sources (e.g., a source(s) external to the DIFCO system such as a third-party identification authority) and may vary in importance in the process of assessing a given access request. Assessment of an access request—e.g., as 'risk' vs. 'okay'—may be embodied in many ways, but the consequences resulting from the assessment of a 'risk' access request may be markedly different from those of traditional access control regimens which completely deny illicit access requests, thereby effectively signaling detection to the potential bad actor making that illicit access request and thereby unwittingly helping them to improve their hack via deduction and elimination. Instead, a DIFCO system may allow differentiated access for 'risk' access requests—rather than block or deny such access requests—such that the thusly accessed service and/or data may be dynamically differentially configured to differ from the normal service and/or normal data requested.

By way of analogy, picture a safe deposit box leased to a bank patron named Alice and protected by a door which can be opened by a specific licit key—i.e., Alice's key. Additionally, a bad actor possesses a 'skeleton' key that is not a duplicate of the licit key, but which also can open the door to Alice's safe deposit box. Furthermore, the lock of the door is devised to uniquely recognize the specific licit key, and if any other key is inserted, it is detected as not being the specific licit key. Turning such a detected not-licit key in the lock causes the licit safe deposit box to be whisked away before the door opens and replaced with a different safe deposit box that appears the same, but which has somewhat different contents. Note that the different contents may perhaps be only slightly different than those in the licit safe deposit box or they may range all the way to wholly different. In contrast, turning the lock with the licit key and opening the door causes no such whisking and therefore exposes Alice's licit safe deposit box and its contents. (It should be noted that a bad actor may steal or copy the licit key or coerce Alice to open the door with the licit key). With a DIFCO system the analogous 'keys' are access requests (perhaps combined with semblances) and the 'contents' are differentially configured service and/or data accesses.

As a further example, a DIFCO system may be operating standalone (as opposed say to actively interoperating as one of several distributed interoperating systems) within a DIFCO Ecosystem 100—perhaps integrated with the operating system of an Accessing Communicator device such as a desktop computer system 119. The exemplary user Alice (not shown) may be attempting to log-in on that computer in order utilize the computer—say off-line initially, but perhaps later communicating over a WAN 140 to access remote services. Alice may enter an access voucher—say a username and a secret password.

Referring once again to FIG. 3 at step 310, in some embodiments, the DIFCO system may receive an access request—i.e., Alice's log-in request including her username/password access voucher.

Referring to step 330, in some embodiments, the DIFCO system may verify the validity of the access voucher. In this example, Alice has entered her username/password correctly. It is verified by the DIFCO system and her access voucher is determined to be valid. Additionally, her account corresponding to her access request is identified utilizing the username portion of her access voucher. The validity of Alice's access voucher and the identification of her account are conveyed in a semblance.

In some embodiments of a DIFCO system, the 'handle' associated with a user of a given account may differ from any username that the user may utilize as an access voucher to access that account as may be well understood by one skilled in the art. For example, Alice may use the handle 'Alice' in association with her Gmail account such that her email address (in the typical format 'handle@domain') is Alice@gmail.com. However, the username for access to her Gmail account may be 'funnygirl'. As a consequence, a bad actor who knows Alice's handle can't assume that her username is the same as that handle. In some embodiments of a DIFCO system, a user may not be allowed to have an identical handle and username associated with a given account.

In some embodiments, a DIFCO system may provide dynamically configured differentiated access to the service(s) and data of a given account to multiple users of that account (e.g., licit 'okay' users and/or illicit 'risk' users) based on a valid access voucher as well as pertinent semblance(s) (i.e., related to such an access request and/or to that account). Such multiple users may utilize different access vouchers to access such a given account wherein each user's different access voucher may correspond to a different dynamically differentially configured access. Additionally, two or more users may share use of the same access voucher for a given account such that each user may gain the same differential access (dynamically configured per access). However, in some embodiments of a DIFCO system, an access request concurrent with a second access request (or an ongoing access) utilizing the same access voucher for a given account may be detected by a DIFCO system such that a semblance conveying such an occurrence may be created. Furthermore, such a 'concurrent accessing' semblance may, in some embodiments, result in an assessment of such a detected concurrent access request such that the access corresponding to that request is differentially configured so as to differ from the other concurrent access(es).

Referring to step 340, in some embodiments, the DIFCO system may assess Alice's access request wherein such assessment may be facilitated by one or more semblances (such as semblance(s) conveying previously observed user and account history and/or remotely sourced semblance(s) as well as semblance(s) resulting from validating Alice's access voucher). The result of such assessment may be the deeming of the type of the access request analyzed—e.g., 'okay' or 'risk' (or 'system-menacing' or 'error', etc.). In this example, Alice's access request is deemed 'okay'

In a given assessment by a DIFCO system, the deeming of an access request may be affected by one or more semblances. For example, the deeming of a 'system-menacing' access request—e.g., part of a DOS attack or some other form of system hacking—may be facilitated by semblance(s) conveying the likely occurrence of an attack and information such as IP address(es) relating the access request to the likely attack. Further by example, the deeming of an 'error' access request may be facilitated by semblance(s) conveying for example a sub-risk threshold count of recent prior 'error' access request(s) for the username associated with the access request (i.e., above that sub-risk threshold count such an access request may be deemed 'risk' as may be well understood by one skilled in the art). (Or perhaps deeming an 'error' access may be facilitated by semblance(s) convey that the password/username associated with the deemed 'error' access request matched no valid username/password combinations. Additionally, the deeming of an 'okay' access request may be facilitated by semblance(s) conveying for example that the password/username associated with the access request validly matched a licit password/username combination. Furthermore, the deeming of a 'risk' access request may be facilitated by semblance(s) conveying for example that the password/username associated with the access request validly matched a 'risk' access password/username combination.

Referring to step 350, in some embodiments, the DIFCO system may grant or deny the access request based on the result of the assessment of that access request. If granted (which it will be in this example for Alice), such access may be dynamically differentially configured such that access may be provided to an at least one differentiated service and/or differentiated data as is further illustrated in FIG. 5.

In some embodiments, a DIFCO system may dynamically differentially configure access to services and/or data such that an access request assessed to be a 'risk' type may be prevented from accessing sensitive data or operation of sensitive services that may expose or alter such sensitive data. An 'okay' access request may be provided dynamically configured differentiated access to normal service and normal data. 'System-menacing' and 'error' access requests may be blocked from access. So for example, a DIFCO system may receive an access request that nearly matches a valid username/password combination and therefore may be assessed to be an 'error' access request. Rather than allowing differentiated access as if this were an attempted 'risk' access request (which it might in fact be), such an assessed 'error' access request may be responded to with an access denial message for the requester. If the assessed 'error' access request were in fact an attempted illicit access request from a bad actor, that bad actor might gain information of limited use as it might not be apparent whether the username or the password was mismatched.

Figure 5:
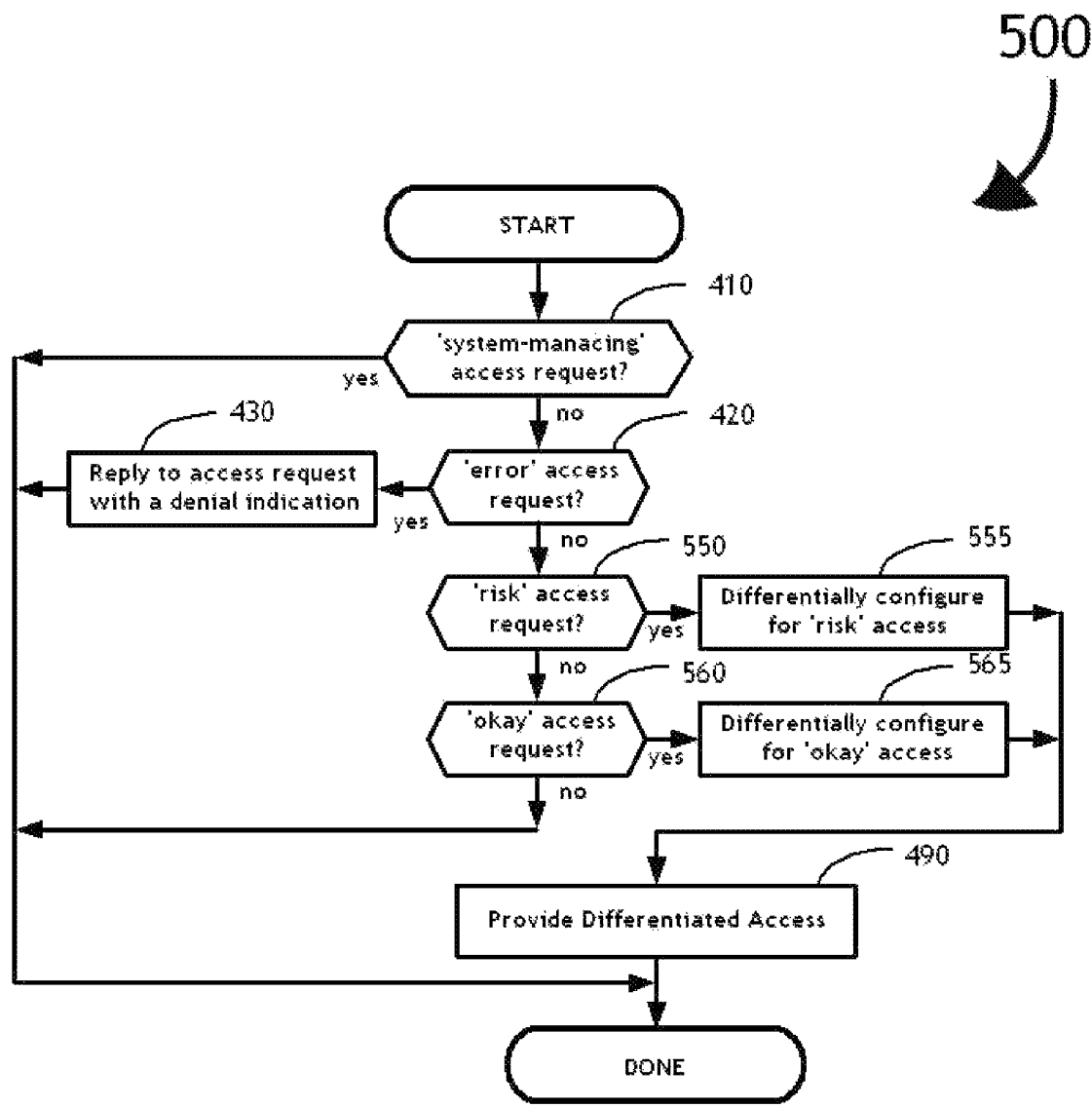
FIG. 5 is a flow diagram further detailing an exemplary variant of functionality of step 350 of FIG. 3.

Note that FIG. 5 illustrates an N=2 (i.e., 'okay' and 'risk') instance of the embodiments illustrated in FIG. 4. Therefore, the steps in common with FIG. 4 are labeled with 4xx label numbers.

Referring to FIG. 5 at step 410, the DIFCO system may further process Alice's access request. If the access request was assessed to be a 'system-menacing' access request, the DIFCO system may forgo providing access of any sort—effectively discarding the access request with no reply to it—and proceed to DONE.

Referring to FIG. 5 at step 420, the DIFCO system may further process Alice's access request. If the access request was assessed not to be an 'error' access request, proceed to step 550.

Referring to FIG. 5 at step 430, the DIFCO system may reply to an 'error' access request with a denial indication. So for example, if Alice had mis-entered her access voucher, a notifying message might be displayed on Alice's device screen. Proceed to DONE.

Referring to step 550, the DIFCO system may further process Alice's access request. If the access request was not deemed to be a 'risk' access request, proceed to step 560.

Referring to step 555, the DIFCO system may dynamically differentially configure 'risk' access such that some or all service(s) and/or data that Alice may normally use may be protected from access. So for example, if Alice's prying boss Ned had coerced Alice to log into her account she might have entered a valid access voucher intended by Alice to result in a 'risk' access request assessment. Proceed to step 490.

Referring to step 560, the DIFCO system may further process Alice's access request. If the access request is assessed not to be an 'okay' access request, proceed to DONE.

Referring to step 565, in some embodiments, the DIFCO system may dynamically differentially configure 'okay' access for Alice. So for this illustrative example of Alice logging into her account to utilize it normally, her correctly entered valid access voucher intended to be assessed as an 'okay' access request has succeeded in doing so. Proceed to step 490.

Referring to FIG. 5 at step 490, in some embodiments, the DIFCO system may provide Alice the differentially configured access to service(s) and/or data. Proceed to DONE.

Referring back to FIG. 3, continuing at step 370, in some embodiments, the DIFCO system may convey information incidental to the access request as semblance(s) for potential use in assessment of future access requests. So for example, the DIFCO system may update semblance(s) conveying use history of the protected system—e.g., user and account histories. With each processed access request and corresponding dynamically differentially configured operation of the protected system, the DIFCO system may accumulate additional semblance-conveyed data that may used in subsequent assessment of access requests. However, during a DOS attack, such incidental information retention may for example be limited to tabulating the IP address and incrementing a corresponding recurrence counter as may be well understood by one skilled in the art.

Referring to step 390, in some embodiments, the DIFCO system may receive zero or more semblance(s) from remote sources.

The ever-changing content that is shared via social media (or say email) combined with the often-evolving groupings of individuals who have shared access to varying amounts of that content, make it very difficult for a DIFCO system to protect sensitive/personal/data in a given licit user's account—especially when that data has been shared even to a limited degree. An illicit user who has coerced a licit user to provide seemingly 'okay' access to the licit user's account may often have some knowledge of the protected/sensitive data in that account. In fact, they may be looking to expose that data in order to cause trouble for the licit user. Additionally, over time many users—both licit and illicit—will become familiar with how a given DIFCO system provides differentiated access.

Consequently, it may become more and more difficult to deceive a coercive illicit user to believe that they have access to the coerced user's normal data in instances when the coerced user has actually provided a 'risk' password thus resulting in 'risk' access. A substitution for or hiding of personal/sensitive data may be a dead giveaway. Another dead giveaway may be the modification or proscription of some services. The coercing illicit user may for example have extensive training in the use of the specific DIFCO system being breached—perhaps the illicit user is an IT professional. Instead of protecting the coerced licit user, that coerced user's situation may be made worse.

Accordingly, in some embodiments, a DIFCO system may retain and utilize semblances conveying historical use patterns for a given account such that divergences from anticipated use patterns may alert the DIFCO system and cause it to impose partial or complete lock-outs as a component of differentiated access. Such lock-outs may thusly be imposed for a given account corresponding to an 'okay' access request as well as for a given account corresponding to a 'risk' access request. In this way, for a 'risk' access, the differentiated service may include intentional lock-outs. However, because intrusive use during an 'okay' access may cause the same sorts of lock-outs, an illicit user may be left with the ambiguity of having too little information to distinguish a 'risk' access from an 'okay' access—i.e., was the illicit user tricked into a 'risk' access or did the illicit user's own intrusive blundering cause a lock-out during an 'okay' access?

Furthermore, such a DIFCO system lock-out during an 'okay' access may provide protection from bad actors that may request 'okay' access utilizing a licit username/password combination—for example, obtained by surreptitious means such as over the shoulder observation or key-press logging by malicious software infecting the licit user's device as may be well understood by one skilled in the art.

In some embodiments, a DIFCO system may utilize the pre-occurrence of specific events conveyed in semblance(s) and/or the absence of such pre-occurrence of specific events conveyed in semblance(s) as an indication(s) and/or an inference(s) that may affect the assessment of a given access request. In the instance of absence of the pre-occurrence of events conveyed in specific semblance(s), a DIFCO system may create or otherwise infer a semblance(s)—at the time of an access request assessment—conveying indication(s) of such absence so as to be utilized in that assessment and/or subsequent assessment(s).

So for example, an access request utilizing Alice's nominally licit username/password combination may actually be assessed as a 'risk' access request if she has failed to text something to a specific number (i.e., provided an out-of-band pre-qualifying semblance). Such an effectively pre-qualifying semblance may have a "time-to-live" enforced by the DIFCO system such that a stale pre-qualifying semblance may be prevented from unintentionally persisting indefinitely as may be well understood by one skilled in the art. So further by example, Alice may text any message to the specific number—say, 'Still meeting Jim?' within 90 seconds (i.e., the time-to-live) of logging-in. The resulting pre-qualifying semblance along with Alice's subsequent timely access request utilizing her licit password may result in an 'okay' access request type assessment by the DIFCO system such that she may have normal use of her services and data (i.e., 'okay' access).

Extending the example, let's assume that Alice's boss Ned may coerce Alice into logging into her account. In this instance, Alice does not send the pre-qualifying semblance text message such that logging-in with her nominally licit username/password combination may result in a 'risk' access type assessment by the DIFCO system such that she (acting on command of intruder Ned) may have 'risk' access (rather than 'okay' access).

In the above example, the pre-qualifying semblance is signaled out-of-band utilizing a service other than the service about to receive the pre-qualified access request. So in a contrasting example, a pre-qualifying semblance(s) may be signaled in-band utilizing the same service as the service about to receive the pre-qualified access request. The in-band pre-qualifying semblance may be the occurrence of three or more assessed 'error' access requests within a 2 minute time-to-live period prior to an access request utilizing Alice's licit username/password combination. So, if Alice makes three or more intentional 'error' access requests within the time to live, her subsequent valid access request is assessed by the DIFCO to be an 'okay' access request. However, should Alice fail to make three or more intentional 'error' access requests within the time to live, her subsequent valid access request is assessed by the DIFCO to be a 'risk' access request. A further refinement of such pre-qualification might for example, require the pre-qualifying 'error' access request(s) to utilize a specific username/password combination, or even a sequence (perhaps ordered) of specific username/password combinations.

Another representative embodiment might imbue use of a keyboard's 'backspace' key with special properties—namely, that the erased symbols are remembered and can serve as an in-band pre-qualifying semblance, such that Alice entering her password as 'z BACKSPACE abc' is interpreted as pre-qualifying semblance 'z' and password 'abc'. In such a case, if 'abc' is the licit password, then the meaning of 'specifying z before entering a licit password' can have any of the special handlings described for DIFCO systems. This example of alternative, possibly silent, interpretations of otherwise ordinary user actions is meant to convey a breadth of similar possibilities (such as a user pressing and then releasing the right-hand shift key on a keyboard) as will be clear to one skilled in the art.

User identification mechanisms are commonly employed to protect computers including components thereof such as devices, programs and/or data. Common computer access control identification mechanisms employ a username access voucher component (such as a text string, identifier, or number) to uniquely identify each particular licit user, account, and/or user role. Associated with that username is typically a single secret password access voucher component (such as a character string or other machine-readable value—often encrypted). When a user seeks or the computer system requests authentication, the user presents the username with its companion secret password. When these two components combined are validated, the user is access-validated, and consequently, may be permitted to operate a device, utilize a service, or otherwise perform access-validated activities. The purpose of this structured identification mechanism is to inform the computer system who it is who seeks to use the device and/or service—via the username. Further, to verify their identity, knowledge of the secret password is demanded. The secret password response provided by the requesting user is validated by comparing it against secure reference data. Such a procedure is familiar to most computer system users.

However, a DIFCO system may for example innovate such a username/secret password regimen (as well as other regimes of user identification and/or user account identification) as an access control mechanism by differentiating the access provided to a given user (e.g., licit user vs. illicit user) based on the secret password entered (in combination with the corresponding account-specific username also entered by that user). In addition to allowing differentiated access by licit users identified by a valid licit access voucher, a DIFCO system may allow differentiated access to an illicit user identified by a valid illicit access voucher. More generally, in some embodiments, the access voucher associated with a given access request may be utilized by a DIFCO system as a semblance useful in the assessment of the access request and the facilitation of the corresponding differentiated access.

There may be many means to protect computers, components thereof, programs or data using access voucher systems, association of users and accounts, and control of privileges and rights. In broad terms access voucher processes are understood as a linkage between a specific account (for example, '12345'), an identified person (for example, 'Alice'), and some private fact known only to Alice (such as a password, perhaps 'AbrahamLincoln') or something unique to her, such as her right thumbprint or a code generated by a cryptographic device.

In common practice Alice enters a public access voucher component (her username), is challenged to present her secret access voucher component (her password), the two components are combined as an access voucher and a match by the user identification/authentication system of the access voucher results in her being granted access with permissions as set for her within the system. One may refer to this case as a "single-mode access voucher system".

Alternatively, several different access voucher systems may be allowed for users. For example, mobile telephones increasingly facilitate users to be access voucher validated using a password (often a numeric PIN), by drawing a pattern on the screen, or with biometric means such as facial recognition or fingerprints. When two or more alternative access voucher systems are allowed, one may refer to it as a "multiple-modes access voucher system".

In an aspect of the present invention—"multi-username" mechanisms—a DIFCO system, in some embodiments, may extend common single-mode access voucher systems to a DIFCO system multiple access voucher enhancement by removing uniqueness expectations so as to allow more than one username to be distinguishingly associated with a single user account or ID. In the example above, account 12345 has the single associated username 'Alice'. In such an enhancing extension, for a given account, it is allowed to have multiple usernames that are valid, for example, Alice, Johnson, and AliceJohnson, each associated with account 12345. Such usernames may function 'distinguishingly' in the above example in that while the alternate usernames equally indicate account 12345, which one is used is noted and recorded as a semblance—i.e., the user associated with account 12345 presented username 'Johnson' which is #2 of the valid ones. It should be noted, that multi-username access voucher mechanisms encompass user account access vouchers of all varieties—public, secret or otherwise—including, but not limited to usernames.

In a further aspect of the present invention—"multi-password" mechanisms—a DIFCO system, in some embodiments, may extend common single-mode voucher systems to a DIFCO system multiple access voucher enhancement by removing uniqueness expectations to allow multiple passwords, PINs, drawings, or other elements of secret knowledge or personal identity (fingerprints as an example) to be distinguishingly associated with a username. In our example of account 12345 and username Alice, that username could be associated with multiple fingerprint patterns, passwords, or other identity mechanisms to provide a multiplicity of access voucher. For example, username Alice and password AbrahamLincoln could be an valid access voucher pair as could username Alice and password GeorgeWashington. Such passwords may be 'distinguishingly' interpreted in the above example in that while the alternate passwords equally access-validate the user Alice, which one is used is noted and recorded to be used as a semblance—i.e., the user associated with username 'Alice' presented the password 'GeorgeWashington' which is #2 of the valid ones. It should be noted, that multi-password access voucher may be embodied utilizing access voucher of all varieties—secret, user-unique (e.g., biometrics) or otherwise—including, but not limited to passwords.

In an additional aspect of the present invention—"multi-voucher" mechanisms—a DIFCO system may, in some embodiments, distinguishingly interpret a user's choice to utilize one of multiple allowable access voucher mechanisms. Such a user's choice of access voucher mechanisms may be 'distinguishingly' interpreted in that while the alternate choices of multiple allowable access voucher mechanisms equally authenticate the user Alice, which mechanism is used is noted and recorded to be used as a semblance. The multiple allowable access voucher mechanisms envisioned here may for example come from: extended and enhanced single-mode access voucher systems (as described in the two aspects of a DIFCO system—i.e., multi-password and multi-username—detailed in the paragraphs above); use of an alternative multiple-modes access voucher system; or the use of more than one access voucher system of any kind.

In yet another aspect of the present invention—"combined-voucher" mechanisms—a DIFCO system may, in some embodiments, distinguishingly interpret a user deliberately sending two or more access vouchers in a sequence—either as a single access request or in a plurality of access requests—where the combined sequence is intended as a signal from the user and where each access voucher in the sequence utilizes a specific one of multiple allowable access voucher mechanisms as a component of the signaling. The signal is encoded across multiple access requests, first using one voucher mechanism and then using another mechanism and so on, such that the sequence of mechanisms is recognized by the DIFCO system and it is their combination that is utilized to derive the signal. Such combined access vouchers may be 'distinguishingly' interpreted in the above example in that while the user may utilize multiple allowable access voucher mechanisms in sequence, the combined sequence of access voucher mechanisms is detected, and the intended signal is decoded, noted and recorded to be used as a semblance. This utilization of multiple access vouchers in combination, including perhaps two or more separate secrets, exhibits greater complexity and therefore more security from hacking than a single access request utilizing a single corresponding access voucher.

Furthermore, in some embodiments of the multi-voucher aspect, some of the access voucher types may be repeated in sequence rather than always varying in type.

Additionally, in some embodiments of the above multi-voucher sequence, the order of use within the sequence of allowable access voucher mechanisms may also be intended by the user as a signal and be accordingly distinguishably interpreted by a DIFCO system. For example, 'use your password first and only then press your finger to the sensor'. Furthermore, in some embodiments this multiple access voucher use could be specifically concurrent—for example, forming a 'chorded key ensemble,' such as holding a finger over a phone's camera while concurrently pressing the fingerprint sensor with a finger.

Additionally, in some embodiments, a combined-voucher mechanism may be augmented utilizing combinations of distinguishable 'non-voucher' mechanism(s) such as: the number of access requests, the temporal separation of access requests, the pattern of alternating access voucher (perhaps independent of the specific content of the access vouchers themselves), and similar intentional access-request-related sequential actions that may be utilized in combination with access voucher mechanisms.

Furthermore, in some embodiments, a DIFCO system may interpret a multi-voucher sequence—say 'A' followed in sequence by 'B'—as a kind of combined access voucher 'AB'. In making the sequential access requests, the access voucher 'A' might be assessed and treated as an 'error' access request but also noted in a semblance—'access voucher A just seen—combine A with the next access voucher seen for this account'. So, when the access voucher 'B' is next attempted for the same account, the assessed access voucher would not be 'B', but rather the combined access voucher 'AB'. The result is a marked improvement in secrecy strength—i.e., the secrecy strength of the two access vouchers taken individually are multiplied together for the combined strength. So for example, a 4-digit pin can be guessed in ½ of 10000 attempts on average. Having to use a access voucher '1234' before using access voucher '5555' means that the difficulty for a guesser goes from 1 in 104 to 1 in 108.

In general, in validating a given access voucher associated with a given access request (or sequence of access requests), some embodiments of a DIFCO system may detect a user signal intentionally encoded therein and may convey information deduced from that user signal in a semblance to be utilized in assessment. In this way, enhanced voucher mechanism(s) and/or other DIFCO-enhanced mechanisms related to an access request(s) may facilitate a DIFCO system to 'distinguishly' interpret an access request (and associated access voucher(s)) or a related sequence of access requests.

In some embodiments as detailed previously, a DIFCO system may, as a result of the validation of an access request, and based on the assessment of that access request, dynamically differentially configure access to the service(s) and/or data of the DIFCO-integrated system subsequent to the validation and assessment but prior to the requested access.

As a concrete example of such dynamic differential configuring, Alice could use one of several usernames—e.g., Alice, AliceJohnson, or Johnson—as a component of her access voucher in an access request. Each such username (each corresponding to a different user role) might cause the DIFCO system to perform a specific differential configuration based on the corresponding validated username. For example, using the Alice username could thusly cause (via dynamic differentiated configuration) her computer or phone background to show personal family photos; the Johnson username could cause the display of a work-related arrangement with business and project status; while the AliceJohnson username could cause the display of an empty background devoid of family and work details suitable for accessing in public or insecure places.

Alternately, she could for example use just one username—Alice—but with different passwords, say AbrahamLincoln, GeorgeWashington, and ThomasJefferson to select from the three device dynamic differential configurations (i.e., each password corresponding to a different 'role', when validated and assessed, would select for a corresponding differential configuration). Or perhaps, Alice might do so with the fingerprint patterns of three different digits. More broadly, any use of various access voucher means, each being distinguishingly associated with one of the visual dynamic differential screen configurations given as examples, is a natural case of using multiple-modes access voucher systems to control the differential configuring of computers, components thereof, programs or data.

Note that utilizing differing access vouchers (i.e., in the above example, the three different passwords associated with the Alice username) may result in correspondingly differing assessments by a DIFCO system—e.g., AbrahamLincoln='okay', GeorgeWashington='risk' and ThomasJefferson='risk' plus a persistent semblance to assess any future access request for username Alice as 'risk'. Additionally, such different dynamic differentiated configurations—each corresponding to a different access voucher for a given account—may enable a positively enhanced experience as opposed to a deceptive one. So for example, in a social-networking service integrating a DIFCO system, each of the multiple differing passwords (or like means) could serve as a signal requesting access differentiated in effective by user role. So for example, the access dynamically differentially configured corresponding to a given access voucher may in effect correspond to the guise of various personas, or personal facets, such that the password used shapes the experience, network of connections, and visible content accessed—based on user roles or facets of life such as 'daddy', 'husband', 'colleague', or 'official'.

In some embodiments, a DIFCO system may be utilized indirectly by a given user effectively selecting from a remotely stored 'menu' of access vouchers. Such a selection of access vouchers may, for example, be maintained by a centralized security service system 230 as described previously above. Utilization of a given access voucher (corresponding to a specific user role) may for example be based on user selection of a service (e.g., log-in to Twitter) corresponding to that access voucher (e.g., username/password for the user's Twitter account). A 'master' access voucher (i.e., utilized by the user to gain access to the services of centralized security service system 230 may additionally serve in essence as a master access voucher to which the user-role-specific access vouchers are effectively subordinate. So further by example, the user-role-specific access vouchers may be username/password combinations used for logging into various of the user's internet accessed service accounts. The user may then for example select from a menu of services—say: GOOGLE+, Facebook, Twitter, LinkedIn and Dropbox—and the centralized security service system 230 may automatically conduct the log-in for that user-selected service utilizing the corresponding username/password access voucher.

In some embodiments, an access voucher may utilize the format: 'roleID/secret-account-ID'. So for example, the 'roleID' may correspond to the user's role—and in effect select for specific dynamic differentiated access—as discussed previously above; and the secret-account-ID may combine the functions of a unique user ID (in this case secret) and secret password.

Another example of extending the utilization of passwords involves a cash withdrawal from an automated teller machine integrated with a DIFCO system. In this example the 'username' is the user's account number present in the banking card and the 'password' is commonly a four digit numeric code known as a Personal Identification Number, or PIN. The extension of passwords by the present invention may, for example, allow for users to create multiple valid PIN numbers and associate dynamic differential configurations (each potentially with subsequent resulting actions) with the various PIN numbers. For example, envision a 'regular' PIN, the use of which would dynamically differentially configure the ATM machine to operate in the normal manner, as well as an 'emergency' PIN, the use of which is a signal to dynamically differentially configure the machine to operate in a dynamically differentially configured manner to the benefit of a user who is being forced to withdraw money by a robber. Here are some exemplary dynamic-differential-configuration-resulting actions of the ATM machine: cause the machine to dispense money slowly; cause the machine to cause the bank to alert the police about the robbery; cause the machine's camera to record continuously; cause the machine to activate an audio recorder; cause the machine to photograph serial numbers of bills dispensed; cause the machine to issue forensically tagged money from a special internal container. Any or all such actions resulting from dynamic differential configuring by a DIFCO system could potentially be directed simply using the emergency PIN as opposed to the regular one.

A further potential utilization of dynamic differential configuring is naturally explained through this example, namely, the dynamic differential configuring of the user's bank account data based on the use of the emergency PIN. One might imagine that showing a very large balance could encourage kidnapping and ransom demands, so the display of a large actual balance could worsen a robbery situation, just as the machine's failure to accept the proffered PIN could lead to violence. Therefore, using the emergency PIN could cause the account balance to be dynamically differentially configured to appear as a small figure, perhaps $153, that could still be withdrawn but would not alert the criminal to a potential million dollar bounty in the actual balance.

Yet another example of the present invention shows the breadth of its applicability to upgrade the security of existing access voucher systems, for example, to enhance the security of single-mode access voucher systems. Some secrecy measures may be more resistant to defeat than others, these may be referred to as "stronger" means as compared to "weaker" ones. A simple example is longer (stronger) vs. shorter (weaker) passwords, or passwords drawn from symbol alphabets of greater vs. smaller cardinality ('alphanumeric plus punctuation' vs. 'lower case'). The present invention may be utilized as an upgrade such that an existing access voucher system may continue to use weaker passwords and yet provide greater protection and thusly achieve a significant security improvement at limited cost. So for example, security mechanisms for ATM cards might still utilize a 4-digit PIN, but be upgraded to enjoy the added security features detailed in the several dynamic differential configuring examples above (e.g., multi-access voucher mechanisms).

In another example of upgrading an existing access voucher system, a DIFCO system might enable several relatively weak 'error' passwords to protect one or more stronger 'okay' passwords from a bad actor attempting to enter the 'okay' password by repeated guessing. Referring to the 'AbrahamLincoln' password example, one could create multiple weaker 'error' passwords such as Abraham, Lincoln, or Abe. The dynamic differential configuring that may result for these weaker 'error' passwords could be utilized to lock the device (perhaps until such time as a special recovery password was used); to report rogue password attempts; to take and report a stealth 'selfie' photograph of the criminal; and/or to report the location of the device. This 'minefield' of weaker 'error' passwords need not be related to the stronger 'okay' password(s) as in 'Abe' to 'AbrahamLincoln'. Optimal weak passwords might well be chosen instead from among guesses often used by those who attempt to defeat the integrity of access voucher systems, with values such as 'PASSWORD', 'ADMIN', 'GUEST', '1234', 'qwerty', and the like. This facility of a DIFCO system builds on the observation that 50% of users are known to employ one or more of the top 25 most commonly used passwords, so using them as 'minefield' values is in anticipation of the values that intruders are likely to try first. As a unique virtue of the DIFCO system, dynamic differential configuring converts these dangerous easily guessable passwords into a strong defensive mechanism.

Expanding on the previous example of using sacrificial passwords as a security-enhancing mechanism, one may further envision a much broader use of a password minefield—i.e., a 'ubiquitous minefield'—where every potential password value other than the one or more 'okay' passwords is intentionally validated as a 'risk' password. Such a sacrificial password may be termed a 'ubiquitous minefield password'. In this mode, every access request is 'successful' in the sense of being accepted, but every password other than the one or more 'okay' passwords leads to a 'risk' dynamic differential configuration where the 'risk' user has the sense of initial success, but is in fact fully confined to a 'walled garden' where they can do no harm (other than to modify data and/or services limited to that 'walled garden' and that may persist so as to be apparent to a subsequent 'risk' access).

As an example, in instances of a fingerprint used as an access voucher (or a component thereof), this 'ubiquitous minefield' might have the result that every finger would unlock a smart phone, say, but all but the owner's fingers would cause the phone to record the fingerprint and forward it to the police or FBI while opening the phone into a 'walled garden' mode from which none of the phone owner's data may be exposed and no malicious actions may be taken. Or, perhaps as a lure, one or more phone calls could be made where the number called, time of day of that call, as well as the 'risk' user's voice would be recorded and sent to police as forensic evidence.

A prior analogy described a hypothetical DIFCO safety-deposit box scenario where the licit key delivered the normal contents and the illicit skeleton key delivered a different box, perhaps empty or perhaps almost the same. Under the scenario of the present 'ubiquitous minefield' example, the box would open with any key whatsoever, yet still, only the owner's key would reveal the 'okay' contents while the universe of other possible keys would yield the 'risk' contents. In this analogy, one might exchange the security of 'those keys that fit the lock may or may not open the box' for the security of 'all keys fit and open the lock, but only a few keys lead to the box owner's actual box'. This analogy illustrates how dynamic differential configuration is in itself a robust security mechanism; and furthering the analogy, how a DIFCO system may make a full range of keys—from two keys up to all keys—into a secure posture.

In a further refinement of a 'ubiquitous minefield', a DIFCO system, in some embodiments, may recognize the potential mis-typing of an 'okay' password and deduce such a potentially mis-typed password to be a non-valid 'error' password rather than the assumed 'risk' password described above. Such a refinement, may slightly decrease the set of potential 'risk' passwords, but may avoid annoying a 'fat-fingered' licit user.

Civil aviation provides a further example of computerized systems amenable to DIFCO-enhancement. The ICAO (International Civil Aviation Organization) and individual countries require that airplanes be equipped with a transponder (TRANSmitter/resPONDER) for radio identification. Transponders reply to ATC secondary surveillance radar with an aircraft identifier and a conspicuity code, also known as a beacon or "squawk" code. If one interprets the aircraft identifier as a 'username' and the conspicuity code as a 'password', then one can understand how the DIFCO system could be applied to increase aviation safety.

In present use, pilots are required to set transponder codes based on flight controller instructions or as pilot-selected flight status indicators according to regulated meanings ('7700' for emergency, '7600' for radio failure, and '7500' for hijacking are three of many codes). Further envisioning the '7500' hijacking case, one may observe that the setting is visible to a hijacker in the cockpit even though the intended effect is to notify air traffic control on the ground.

Contrast the transponder in the example above with a DIFCO-system-integrated with a computerized transponder which might instead send a non-hijacker-apparent '7500' (or other) flight status indicator. The operator of such a transponder might be assumed to be a licit user and the means to obtain a surreptitious setting and transmission of code 7500 might not happen observably but rather by surreptitious means, such as may be signaled by setting the code dials for any chosen code from left to right rather than right to left. Such a surreptitious signal may be assessed by a DIFCO-integrated transponder as a 'risk' access request in which case the transponder may be dynamically differentially configured such that dialed code would be displayed but the urgent 7500 would be transmitted by the transponder with the hijacker unaware.

Furthermore, such a dynamic differentiated configuration of the transponder for a surreptitious 7500 could additionally cause a DIFCO-enabled airplane to be dynamically differentially configured for anti-hijacking: fuel gauges could decline at rates greater than actual to suggest short available range, alarm sensors could be triggered to suggest a lack of oxygen, failing engines, icing, dead instruments, or other dynamically differentially configured means to deceive the criminal that the plane must land soon and short of its hijack destination.

The above example of dynamic differential configuring the airplane's computerized systems and devices based on which of several code choices are made (or how they are entered) further shows the broadly-applicable nature of DIFCO systems. More generally, it should be noted that a DIFCO ecosystem 100 may include DIFCO systems that are airborne, maritime, deep sea, orbital or in deep space. In fact the more mission-critical the DIFCO system—e.g., self-driving tractor-trailer, un-manned strategic bomber, Mars robotic rover, missile-launch-detection satellite—the more potentially valuable the enhanced security it may provide.

In some embodiments, the present invention may be utilized in combination with numerous variations of access vouchers including, but not limited to, those discussed in the paragraphs below.

In some embodiments, a DIFCO system may utilize two valid passwords corresponding to a given username, one primary and one secondary, the secondary being a transliteration of the primary based on keyboard limitations. So for example, the primary password may be a 'standard' alphanumeric password and the secondary password may be a corresponding reduced password associated with a reduced capability keyboard such as a phone keypad. So, for example, the primary password may have the value 'ABCD' and the secondary password may utilize an equivalent series of numbers corresponding to these letters as labeled on a telephone keypad—i.e., '2223'.

In some embodiments, a DIFCO system may utilize temporal variation in user authentication. For example, the DIFCO system may utilize successive (and potentially cyclical) selection through an ordered list of password alternates as a strengthening security measure. Such alternation of passwords may by analogy be compared to the alternation of encryption keys used in successive one-time pad encrypted messages as may be well understood by one skilled in the art. This strengthening security mechanism thusly associates a successive series of secret passwords with one account so as to prevent malicious observation from compromising password protection, In some embodiments, a DIFCO system may facilitate use of multiple valid passwords for a given valid username to selectively enable an inclusive sequence of increasingly powerful operational authorities. Such a series of valid passwords may facilitate access to an inclusive series of security realms: valid password P1 facilitates accessing realm R1 (say a bank lobby); valid password P2 facilitates accessing realms R1+R2 (lobby and deposit boxes); valid password P3 facilitates accessing realms R1+R2+R3 (lobby, deposit boxes, and vault). Such security realms may be inclusive, representing not selection as in 'P1=R1, P2=R2, P3=R3' but rather ordered aggregation, as in 'P1=R1, P2=R1+R2, P3=R1+R2+R3'.

In some embodiments, a DIFCO system may utilize multiple passwords to selectively enable a tree-structured hierarchy of increasingly powerful operational authorities wherein a tree structure of rights may be traversed based on the hierarchical ranking of a given password resulting in aggregation of authorities along the path between the root node and a specific password-identified node in the tree. (An alternative embodiment may utilize a linear list of increasing and inclusive authorities).

Figure 6:
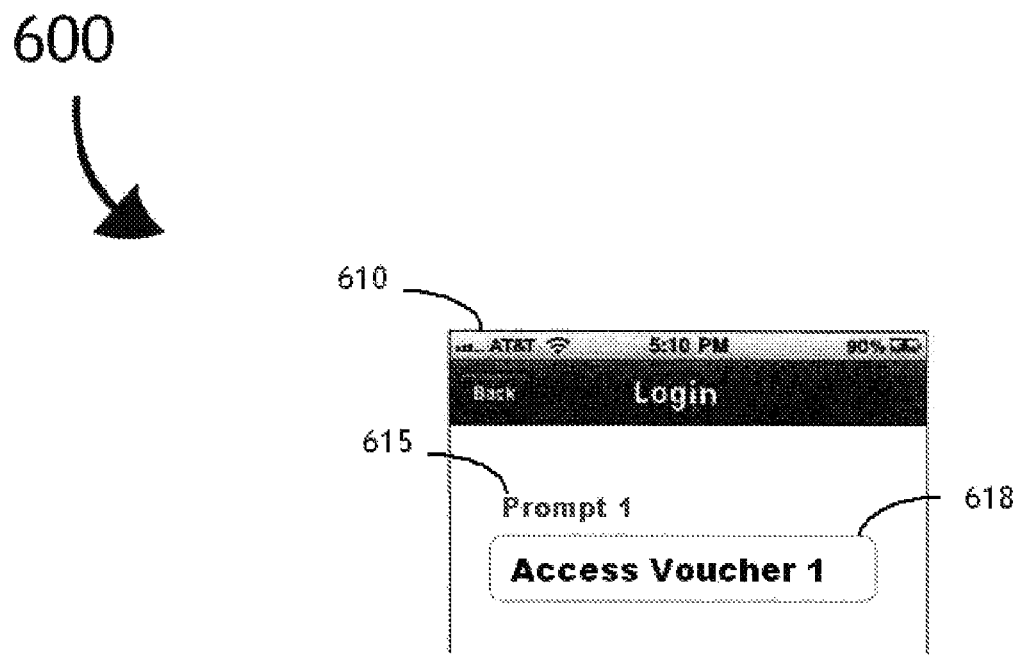
FIG. 6 is an exemplary screen image detailing graphical user interfaces utilized by exemplary embodiments of a DIFCO system within the DIFCO Ecosystem of FIG. 1.

FIG. 6 illustrates user interfaces that may facilitate users—those users requesting differentiated access from a DIFCO system—to enter access voucher(s). FIG. 6 provides an exemplary screen 6000 to illustrate graphical user interfaces that different users may utilize to enter differing access vouchers such that each user utilizing a unique access voucher may request dynamically differentially configured access corresponding to the access voucher entered by that user.

A user utilizing exemplary screen 610 may be facilitated by a prompt 615 to enter an access voucher 618.

In some embodiments, a DIFCO system may be "pervasive"—i.e., it may facilitate additional security mechanisms integrated within the service-providing-system such that, for example, post log-in behavior of a given user may be monitored for suspicious behavior(s) that may indicate that security has been compromised either via log-in or perhaps other means. Such monitoring may result in semblances that may be retained for use in the assessment of future access requests.

Furthermore, in some embodiments, such a more pervasive DIFCO system may include facilities intended to detect and operate in security-degraded environments. For example, a pervasive DIFCO system may be integrated in a laptop computer system that has been compromised by malware that may interdict and/or alter communication between that laptop computer and remote systems. Or perhaps, the compromise is remote, but in the path of communications—say a compromised home router. The pervasive DIFCO system may for example detect irregularities in communications with remote DIFCO systems that provide semblances or perhaps changes to or deletion of a local file used to store accumulated semblances. Such detected suspicious circumstances may cause such a pervasive DIFCO system to take various measures such as transmitting security alert(s) to remote system(s), displaying security alert(s) on the laptop computer's screen or perhaps actively protecting resources on the potentially compromised laptop.

In some embodiments of a DIFCO system, access requests may be instance-specific and have no persistence. For example, such an instance-specific non-persistent access request may be a request to read a specific item of data from a DIFCO system-integrated data base server. Any such access granted as a result of such an instance-specific non-persistent access request would be one-time—not allowing for subsequent accesses relying on that access request. Furthermore, each such instance-specific non-persistent access request may include (or in some fashion reference) an associated access voucher—for example including an encrypted token.

In some embodiments, a DIFCO system may facilitate the creation and management of a given account—perhaps via account management user tools utilizing a menu driven graphical user interface (not shown). Such a DIFCO system enabled account management facility might be utilized by an authorized administrative user to create and manage a set of access vouchers for a given account as well as defining and associating corresponding types of access and associating access vouchers with individual types of access. For example, a DIFCO system may provide account management user tools allowing an account's owner to define other types of differentially configured access (perhaps via a checklist of 'permissions' and 'prohibitions') for that account and associate a corresponding access voucher(s) with each of those created access types. In some embodiments, access types may be pre-defined such that an account owner might associate an access voucher with a given access type selected from a menu of pre-defined access types. Furthermore, such an account facility might enable an account owner to define rules for the validation of access vouchers and the assessment of access requests including rules for acquiring and utilizing semblance(s) in a given assessment. In some embodiments, DIFCO system account management user tools may enable user apparent logical constructs such as 'roles' and corresponding 'role-specific' configuration.

In some embodiments, a DIFCO system may facilitate account-specific user configuration of such a DIFCO system and/or a service-providing system integrated with such a DIFCO system. In some embodiments, such user configuration may include choice of: an access voucher system; an emergency-signaling access voucher; and the related 'what actions are taken by the DIFCO system when an emergency-signaling access voucher is entered' (e.g., notify the police). For example, such emergency-signaled actions may be selected from pre-configured 'standard' options (e.g., in the case of an ATM emergency PIN, 'notify the bank and police', or they may be custom defined by the user (or others on the user's behalf).

In some embodiments, some aspects of configuring a DIFCO system and/or a service-providing system integrated with such a DIFCO system may be required for some or all users (and perhaps configured by an authorized administrative user). For example, for users within an organization (e.g., a business or other controlling entity) certain configuration(s) may be mandatorily standardized for most or all users. Further by example, such a user may be required to define a 'doomsday' password that may cause a DIFCO system-integrated device (e.g., a smart phone) to logically or physically disable its operation and encrypt or delete its data so as to protect organization-sensitive or legally protected information (such as HIPAA protected data, client-privileged disclosures, judicial notes, or Secret, Top Secret, SCI, and ECI information).

In the foregoing discussion of various potential embodiments of the present invention, passwords and usernames may have been utilized as easily relatable examples of access vouchers. However, embodiments of the present invention may utilize a myriad of user identifying mechanisms and techniques including, but not limited to encrypted handshakes, certificate exchanges, utilization of trusted intermediaries, biometric measurement, as well as other means of identification—utilized individually and/or in combination. Additionally, access vouchers may be supplemented by and assessed utilizing one or more semblances. Instances of semblances described in the above discussions were provided as examples only. Embodiments of the present invention may utilize a variety of semblances—both individually and cumulatively—that may be directly measured (e.g., utilizing sensors), inferred (e.g., using statistical prediction based on prior behaviors) or otherwise acquired, derived and/or deduced. Access vouchers and semblances as illustratively described may facilitate visualizing embodiments of the present invention, however, they provide details of exemplary mechanisms that may achieve the larger goal of assessing more than one type of access request such that different access request types may be granted dynamically differentially configured access wherein the accessed computer services and/or data may be differentiated based on assessed access type.

In accordance with various permutations of possible embodiments, it is contemplated that the potential hierarchies of role relative to assessment result type are inconsequential to the spirit of the present invention. In some embodiments, roles and assessment result type are used interchangeably. In some embodiments, role and assessment result type may also be independent or partially dependent relative to each other. For example, a role may be the essential determinant of a given assessment result type (e.g., 'account-owner' where 'account-owner' is a role); or a role may be the primary determinant of a given assessment result type along with other ancillary determinant(s)—i.e., hierarchical sub-determinant(s)—(e.g., 'boss/risk' where the role 'boss' is the primary determinant and 'risk' is an ancillary determinant); or a role may be utilized as an ancillary determinant of a given assessment result type (e.g., 'error/mom' where 'error' is the primary determinant and the role 'mom' is an ancillary determinant); or a role and other determinant(s) may share as essential determinants (e.g., 'okay-boyfriend' or equivalently 'boyfriend-okay' where 'okay' and the role 'boyfriend' are hierarchically equivalent (and therefore interchangeable) essential determinants).

Furthermore, in accordance with various permutations of possible embodiments, it is contemplated that the potential hierarchies of 'differentially configuring'—e.g., 'differentially configuring access' vs. 'differentially configuring service(s) and/or data' are inconsequential to the spirit of the present invention. In some embodiments, 'differentially configuring access' and 'differentially configuring service(s) and/or data' are used interchangeably. In some embodiments, 'differentially configuring access' and 'differentially configuring service(s) and/or data' may also be independent or partially dependent relative to each other. For example, 'differentially configuring service(s) and/or data' may be accomplished in part or in whole by 'differentially configuring access' to such service(s) and or data (e.g., access to service(s) variants and/or to alternative data values); or, 'differentially configuring access' may be accomplished in part or in whole by 'differentially configuring service(s) and/or differentially configuring data' (e.g., service(s) and/or data may be differentially configured so as to enable or prevent access to them). Furthermore, in a DIFCO system, differentiated access, differentiated service(s) and/or differentiated data may be dynamically configured, whether or not explicitly stated.

In sum, the present invention provides systems and methods for differentiated identification for configuration and operation. The advantages of such a system include the ability to limit, alter or prevent illicit accesses (e.g., accidental, malicious or otherwise undesirable and/or unintended accesses) to sensitive computerized user services and/or data while seemingly—but actually not—providing 'normal' access. Such limitation or prevention may be affected by such a system so as to be difficult to detect or to discriminate from normal unlimited operation—particularly automatically by computerized techniques—so as to foil, confuse, hamper and/or deter bad actors. Furthermore, the benefits of the present invention may apply not only to surreptitious access attempts, but also to physically present—perhaps coerced—access attempts. In threatening criminal situations, a DIFCO-enabled apparently successful breach as opposed to a pre-DIFCO' access denied' refusal—may be the difference between the threatened user's life and death.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for providing dynamically differentially morphed access to a requester, the method comprising:
   receiving an access request including at least one differentiable voucher from a requester;
   assessing the type of the received access request by considering the access request, the differentiable voucher and at least one semblance, wherein the at least one semblance originates from an external source using out-of-band communications, wherein the least one semblance is derived from confirming verisimilitude of the at least one differentiable voucher, and wherein the at least one differentiable voucher is one of a multi-username differentiable voucher, a multi-password differentiable voucher, a multi-voucher differentiable voucher and a combined-voucher differentiable voucher;
   dynamically differentially morphing an access to at least one service or data based on the assessment of the access request type; and
   providing the requester at least one dynamically differentially morphed access to the at least one service or data.

2. The method of claim 1 wherein the at least one differentiable voucher is selectable by the requester from a plurality of acceptable differentiable vouchers.

3. The method of claim 1 wherein the at least one semblance is transformed by an earlier assessment.

4. The method of claim 1 wherein the at least one dynamically differentially morphed access to the at least one service or data includes an account lock-out.

5. A differentiated identification computerized system for facilitating dynamically differentially morphed access to a requester, the differentiated identification system configured to:
   receive an access request including at least one differentiable voucher from a requester;
   assess the type of the received access request by considering the access request, the differentiable voucher and at least one semblance, wherein the at least one semblance originates from an external source using out-of-band communications, wherein the at least one semblance is derived from confirming verisimilitude of the least one differentiable voucher, and wherein the at least one differentiable voucher is one of a multi-username differentiable voucher, a multi-password differentiable voucher, a multi-voucher differentiable voucher and a combined-voucher differentiable voucher;

dynamically differentially morphs an access to at least one service or data based on the assessment of the access request type; and provide the requester at least one dynamically differentially morphed access to the at least one service or data.

6. The system of claim 5 wherein the at least one differentiable voucher is selectable by the requester from a plurality of acceptable differentiable vouchers.

7. The system of claim 5 wherein the at least one semblance is transformed by an earlier assessment.

8. The system of claim 5 wherein the at least one dynamically differentially morphed access to the at least one service or data includes an account lock-out.

* * * * *